United States Patent
Gollakota et al.

(10) Patent No.: US 11,212,479 B2
(45) Date of Patent: Dec. 28, 2021

(54) IMAGE AND/OR VIDEO TRANSMISSION USING BACKSCATTER DEVICES

(71) Applicant: University of Washington, Seattle, WA (US)

(72) Inventors: Shyamnath Gollakota, Seattle, WA (US); Saman Naderiparizi, Seattle, WA (US); Mehrdad Hessar, Seattle, WA (US); Vamsi Talla, Seattle, WA (US); Joshua R. Smith, Seattle, WA (US)

(73) Assignee: University of Washington, Seattle, WA (US)

( * ) Notice: Subject to any disclaimer, the term of this patent is extended or adjusted under 35 U.S.C. 154(b) by 133 days.

(21) Appl. No.: 16/603,195

(22) PCT Filed: Apr. 6, 2018

(86) PCT No.: PCT/US2018/026545
§ 371 (c)(1),
(2) Date: Oct. 4, 2019

(87) PCT Pub. No.: WO2018/187737
PCT Pub. Date: Oct. 11, 2018

(65) Prior Publication Data
US 2021/0084251 A1     Mar. 18, 2021

Related U.S. Application Data

(60) Provisional application No. 62/482,297, filed on Apr. 6, 2017.

(51) Int. Cl.
*H04N 5/40*     (2006.01)
*H04N 7/045*    (2006.01)
(Continued)

(52) U.S. Cl.
CPC ............ *H04N 5/40* (2013.01); *H04N 5/335* (2013.01); *H04N 5/44* (2013.01); *H04N 7/045* (2013.01)

(58) Field of Classification Search
CPC ...... H04N 1/00103; H04N 5/335; H04N 5/40; H04N 5/44; H04N 7/045
(Continued)

(56) References Cited

U.S. PATENT DOCUMENTS 4,298,280 A   11/1981   Harney
4,916,460 A    4/1990   Powell
(Continued)

FOREIGN PATENT DOCUMENTS

CN   202713631 U   1/2013
EP     2575309 A1   4/2013
(Continued)

OTHER PUBLICATIONS

US 10,187,177 B2, 01/2019, Gollakota et al. (withdrawn)
(Continued)

*Primary Examiner* — Sherrie Hsia
(74) *Attorney, Agent, or Firm* — Dorsey & Whitney LLP

(57) ABSTRACT

Examples described herein include systems, devices, and methods for backscattering carrier signals in accordance with pixel values of an image and/or video. Signals having a property proportionate to pixel values may be converted into a pulse-containing waveform having pulses whose widths and/or duty cycles are determined based on the pixel values. Backscatter transmitters may backscatter a carrier signal in accordance with the pulse-containing waveform to provide the pixel values to a receiver. In this manner, video transmission at low power and/or battery-free operation may be provided.

18 Claims, 4 Drawing Sheets

(51) Int. Cl.
*H04N 5/335* (2011.01)
*H04N 5/44* (2011.01)

(58) Field of Classification Search
USPC ........ 725/105, 109, 118, 131, 133; 348/294, 348/211.3, 254–256
See application file for complete search history.

(56) References Cited

U.S. PATENT DOCUMENTS

| | | |
|---|---|---|
| 5,164,985 A | 11/1992 | Nysen et al. |
| 5,220,330 A | 6/1993 | Salvail et al. |
| 5,321,599 A | 6/1994 | Tanamachi et al. |
| 5,649,296 A | 7/1997 | Maclellan et al. |
| 5,663,710 A | 9/1997 | Fasig et al. |
| 5,784,686 A | 7/1998 | Wu et al. |
| 5,873,025 A | 2/1999 | Evans et al. |
| 5,995,040 A | 11/1999 | Issler et al. |
| 6,016,056 A | 1/2000 | Seki |
| 6,084,530 A | 7/2000 | Pidwerbetsky et al. |
| 6,094,450 A | 7/2000 | Shockey |
| 6,107,910 A | 8/2000 | Nysen |
| 6,243,012 B1 | 6/2001 | Shober et al. |
| 6,259,408 B1 | 7/2001 | Brady et al. |
| 6,297,696 B1 | 10/2001 | Abdollahian et al. |
| 6,611,224 B1 | 8/2003 | Nysen et al. |
| 6,745,008 B1 | 6/2004 | Carrender et al. |
| 6,765,476 B2 | 7/2004 | Steele et al. |
| 6,838,989 B1 | 1/2005 | Mays et al. |
| 6,870,460 B2 | 3/2005 | Turner et al. |
| 6,970,089 B2 | 11/2005 | Carrender |
| 7,107,070 B2 | 9/2006 | Auffret et al. |
| 7,180,402 B2 | 2/2007 | Carrender et al. |
| 7,215,976 B2 | 5/2007 | Brideglall |
| 7,358,848 B2 | 4/2008 | Mohamadi |
| 7,469,013 B1 | 12/2008 | Bolt et al. |
| 7,535,360 B2 | 5/2009 | Barink et al. |
| 7,796,016 B2 | 9/2010 | Fukuda |
| 7,839,283 B2 | 11/2010 | Mohamadi et al. |
| 7,961,093 B2 | 6/2011 | Chiao et al. |
| 7,995,685 B2 | 8/2011 | Wang et al. |
| 8,026,839 B2 | 9/2011 | Weber |
| 8,120,465 B2 | 2/2012 | Drucker |
| 8,170,485 B2 | 5/2012 | Hulvey |
| 8,248,263 B2 | 8/2012 | Shervey et al. |
| 8,284,032 B2 | 10/2012 | Lee et al. |
| 8,325,014 B1 | 12/2012 | Sundstrom et al. |
| 8,391,824 B2 | 3/2013 | Kawaguchi |
| 8,526,349 B2 | 9/2013 | Fisher |
| 8,797,146 B2 | 8/2014 | Cook et al. |
| 8,952,789 B2 | 2/2015 | Dardari |
| 8,971,704 B2 | 3/2015 | Cavaliere et al. |
| 9,252,834 B2 | 2/2016 | Seller et al. |
| 9,312,950 B1 | 4/2016 | Deyle |
| 9,357,341 B2 | 5/2016 | Deyle |
| 9,680,520 B2 | 6/2017 | Gollakota et al. |
| 9,973,367 B2 | 5/2018 | Gollakota et al. |
| 10,033,424 B2 | 7/2018 | Gollakota et al. |
| 10,079,616 B2 | 9/2018 | Reynolds et al. |
| 10,270,639 B2 | 4/2019 | Gollakota et al. |
| 10,812,130 B2 | 10/2020 | Talla et al. |
| 10,873,363 B2 | 12/2020 | Gollakota et al. |
| 10,951,446 B2 | 3/2021 | Kellogg et al. |
| 2002/0015436 A1 | 2/2002 | Ovard et al. |
| 2003/0043949 A1 | 3/2003 | O'Toole et al. |
| 2003/0133495 A1 | 7/2003 | Lerner et al. |
| 2003/0174672 A1 | 9/2003 | Herrmann |
| 2004/0005863 A1 | 1/2004 | Carrender |
| 2004/0210611 A1 | 10/2004 | Gradishar et al. |
| 2005/0053024 A1 | 3/2005 | Friedrich |
| 2005/0099269 A1 | 5/2005 | Diorio et al. |
| 2005/0201450 A1 | 9/2005 | Volpi et al. |
| 2005/0248438 A1 | 11/2005 | Hughes et al. |
| 2005/0253688 A1 | 11/2005 | Fukuda |
| 2005/0265300 A1 | 12/2005 | Rensburg |
| 2006/0044147 A1 | 3/2006 | Knox et al. |
| 2006/0045219 A1 | 3/2006 | Wang et al. |
| 2006/0082458 A1 | 4/2006 | Shanks et al. |
| 2006/0087406 A1 | 4/2006 | Willins et al. |
| 2006/0109127 A1 | 5/2006 | Barink et al. |
| 2006/0220794 A1 | 10/2006 | Zhu |
| 2006/0236203 A1 | 10/2006 | Diorio et al. |
| 2006/0261952 A1 | 11/2006 | Kavounas et al. |
| 2007/0018904 A1 | 1/2007 | Smith |
| 2007/0046434 A1 | 3/2007 | Chakraborty |
| 2007/0069864 A1 | 3/2007 | Bae et al. |
| 2007/0096876 A1 | 5/2007 | Bridgelall et al. |
| 2007/0109121 A1 | 5/2007 | Cohen |
| 2007/0111676 A1 | 5/2007 | Trachewsky et al. |
| 2007/0115950 A1 | 5/2007 | Karaoguz et al. |
| 2007/0201786 A1 | 8/2007 | Wuilpart |
| 2007/0210923 A1 | 9/2007 | Butler et al. |
| 2007/0285245 A1 | 12/2007 | Djuric et al. |
| 2007/0293163 A1 | 12/2007 | Kilpatrick |
| 2008/0068174 A1 | 3/2008 | Al-mahdawi |
| 2008/0131133 A1 | 6/2008 | Blunt et al. |
| 2008/0136646 A1 | 6/2008 | Friedrich |
| 2008/0165007 A1 | 7/2008 | Drago et al. |
| 2008/0180253 A1 | 7/2008 | Ovard et al. |
| 2008/0207357 A1 | 8/2008 | Savarese et al. |
| 2008/0211636 A1 | 9/2008 | O'Toole et al. |
| 2008/0216567 A1 | 9/2008 | Breed |
| 2008/0225932 A1 | 9/2008 | Fukuda |
| 2008/0252442 A1 | 10/2008 | Mohamad et al. |
| 2008/0278293 A1 | 11/2008 | Drucker |
| 2009/0099761 A1 | 4/2009 | Davis et al. |
| 2009/0189981 A1 | 7/2009 | Siann et al. |
| 2009/0201134 A1 | 8/2009 | Rofougaran |
| 2009/0243804 A1 | 10/2009 | Fukuda |
| 2009/0252178 A1 | 10/2009 | Huttunen et al. |
| 2010/0156651 A1 | 6/2010 | Broer |
| 2010/0271188 A1 | 10/2010 | Nysen |
| 2011/0053178 A1 | 3/2011 | Yang |
| 2011/0069777 A1 | 3/2011 | Hurwitz et al. |
| 2011/0080267 A1 | 4/2011 | Clare et al. |
| 2011/0260839 A1 | 10/2011 | Cook et al. |
| 2012/0001732 A1 | 1/2012 | Kawaguchi |
| 2012/0002766 A1 | 1/2012 | Kawaguchi |
| 2012/0051411 A1 | 3/2012 | Duron et al. |
| 2012/0099566 A1 | 4/2012 | Laine et al. |
| 2012/0112885 A1 | 5/2012 | Drucker |
| 2012/0245444 A1 | 9/2012 | Otis et al. |
| 2012/0311072 A1 | 12/2012 | Huang et al. |
| 2012/0313698 A1 | 12/2012 | Ochoa et al. |
| 2013/0028305 A1 | 1/2013 | Gollakota et al. |
| 2013/0028598 A1 | 1/2013 | Cavaliere et al. |
| 2013/0069767 A1 | 3/2013 | Ovard et al. |
| 2013/0176115 A1 | 7/2013 | Puleston et al. |
| 2013/0215979 A1 | 8/2013 | Yakovlev et al. |
| 2013/0223270 A1 | 8/2013 | Cheng |
| 2013/0265140 A1 | 10/2013 | Gudan et al. |
| 2013/0286959 A1 | 10/2013 | Lou et al. |
| 2013/0299579 A1 | 11/2013 | Manku |
| 2013/0322498 A1 | 12/2013 | Maquire |
| 2014/0016719 A1 | 1/2014 | Manku |
| 2014/0044233 A1 | 2/2014 | Morton |
| 2014/0113561 A1 | 4/2014 | Maguire |
| 2014/0313071 A1 | 10/2014 | Mccorkle |
| 2014/0357202 A1 | 12/2014 | Malarky |
| 2014/0364733 A1 | 12/2014 | Huang et al. |
| 2015/0091706 A1 | 4/2015 | Chemishkian et al. |
| 2015/0108210 A1 | 4/2015 | Zhou |
| 2015/0168535 A1 | 6/2015 | Httner et al. |
| 2015/0311944 A1 | 10/2015 | Gollakota et al. |
| 2015/0381269 A1 | 12/2015 | Deyle |
| 2016/0094933 A1 | 3/2016 | Deyle |
| 2016/0266245 A1 | 9/2016 | Bharadia et al. |
| 2016/0365890 A1 | 12/2016 | Reynolds et al. |
| 2017/0180075 A1 | 6/2017 | Gollakota et al. |
| 2017/0180178 A1 | 6/2017 | Gollakota et al. |
| 2017/0180703 A1 | 6/2017 | Kovacovsky et al. |
| 2017/0331509 A1 | 11/2017 | Gollakota et al. |
| 2018/0024224 A1 | 1/2018 | Seller |
| 2018/0331865 A1 | 11/2018 | Ziv et al. |
| 2018/0358996 A1 | 12/2018 | Gollakota et al. |

(56) References Cited

U.S. PATENT DOCUMENTS

| | | | |
|---|---|---|---|
| 2018/0375703 | A1 | 12/2018 | Kellogg et al. |
| 2019/0116078 | A1 | 4/2019 | Gollakota et al. |
| 2019/0158341 | A1 | 5/2019 | Talla et al. |
| 2020/0052734 | A1 | 2/2020 | Talla et al. |
| 2020/0125916 | A1 | 4/2020 | Karani et al. |
| 2020/0212956 | A1 | 7/2020 | Gollakota et al. |
| 2021/0099198 | A1 | 4/2021 | Reynolds et al. |

FOREIGN PATENT DOCUMENTS

| | | |
|---|---|---|
| EP | 2975814 A1 | 1/2016 |
| EP | 2976734 | 1/2016 |
| WO | 2014153516 A1 | 9/2014 |
| WO | 2015123306 A1 | 8/2015 |
| WO | 2015123341 A1 | 8/2015 |
| WO | 2016100887 A2 | 6/2016 |
| WO | 2017027847 A1 | 2/2017 |
| WO | 2017132400 A1 | 8/2017 |
| WO | 2017176772 A1 | 10/2017 |
| WO | 2018075653 A1 | 4/2018 |
| WO | 2018187737 A1 | 10/2018 |

OTHER PUBLICATIONS

US 10,187,241 B2, 01/2019, Gollakota et al. (withdrawn)

Analog devices—rf/if circuits, http://www.analog.com/library/analogDialogue/archives/43-09/EDCh%204%20rf%20if.pdf, Jan. 2007.

Cadence, "Cadence Spectre RF Option", http://www.cadence.com/products/rf/spectre_rf_simulation/pages/default.aspx. (Retrieved Jul. 19, 2018).

Digipoints. DigiPoints Series vol. 1 Leader Guide Module 9—Network Architectures. Sep. 18, 2015, p. 9.i-9.18.

IEEE, "IEEE Standard for Ethernet", http://standards.ieee.org/getieee802/download/802.11-2012.pdf., Dec. 28, 2012.

International Search Report and Written Opinion dated Jun. 29, 2018 for PCT Application No. PCT/US2018/026545, 22 pages.

Maxim Integrated, "2.4GHz to 2.5GHz 802.11 g/b FR Transceiver, PA, and Rx/Tx/Antenna Diversity Switch", https://datasheets.maximintegrated.com/en/ds/MAX2830.pdf. (Retrieved Jul. 19, 2018).

NASA, "A Wi-Fi Reflector Chip To Speed Up Wearables", http://www.jpl.nasa.gov/news/news.php?feature=4663. Jul. 22, 2015.

Qualcomm, "AR9462 Single-chip, 2.4/5GHz, 2-stream 802.11a/b/g/n and BT 4.0 + HS SoC Solution with SST Technology", http://www.qca.qualcomm.com/wp-content/uploads/2013/11/AR9462.pdf. (Retrieved Jul. 19, 2018).

Qualcomm. "QCA4002/4004 Qualcomm low-power Wi-Fi", http://www.eeworld.com.cn/zt/wireless/downloads/QCA4002-4004FIN.pdf. (Retrieved Jul. 19, 2018).

Synopsys, "Concurrent Timing, Area, Power and Test Optimization", http://www.synopsys.com/Tools/Implementation/RTLSynthesis/DesignCompiler/Pages/default.aspx. (Retrieved Jul. 19, 2018).

U.S. Appl. No. 15/752,214 entitled 'Backscatter Devices and Network Systems Incorporating Backscatter Devices' filed Feb. 12, 2018, pp. all.

U.S. Appl. No. 15/923,238 titled "Radio Frequency Communication Devices Having Backscatter and Non-Backscatter Communication Modes and Hardware Re-Use" filed Mar. 16, 2018.

U.S. Appl. No. 16/119,055 titled "Devices and Methods for Backscatter Communication Using One or More Wireless Communication Protocols Including Bluetooth Low Energy Examples" filed Aug. 31, 2018.

U.S. Appl. No. 16/343,088 titled "Backscatter Systems, Devices, and Techniques Utilizing CSS Modulation and/or Higher Order Harmonic Cancellation" filed Apr. 18, 2019.

Unknown, "Altera de 1 fpga development board", http://www.terasic.com.tw/cgi-bin/page/archive.pl?No=83.(Retrieved Jul. 19, 2018).

Unknown, "Analog Devices HMC190BMS8/190BMS8E", https://www.hittite.com/content/documents/data_sheet/hmc190bms8.pdf. (Retrieved Jul. 19, 2018).

Unknown, "Nest Cam Indoor", https://nest.com/camera/meet-nestcam/?dropcam=true. 2018. (Retrieved Jul. 19, 2018).

"Advanced Television Systems Committee (ATSC) (Sep. 1995) "ATSC Digital Television Standard," ATSC Doc. A/53, 74 pages", Sep. 1995.

"Analog Devices (retrieved Apr. 2016) "ADG919 RF Switch Datasheet," available online at: http://www.datasheet-pdf.com/PDF/ADG919-Datasheet-AnalogDevices-140819", Apr. 2016.

"Analog Devices, Inc. (retrieved Jan. 2016) "ADG902 RF switch datasheet," available online at: http://www.analog.com/static/imported-files/data_sheets/adg901_902.pdf", Jan. 2016.

"Axcera.com (retrieved Jan. 2016) "8VSB vs. COFDM," available online at: http://www.axcera.com/downloads/technotes-whitepapers/technote_4.pdf", Jan. 2016.

"DiBEG (May 2014; retrieved Jan. 2016) "The Launching Country," available online at: http://www.dibeg.org/world/world.html", May 2014.

"E. Inc. (retrieved Apr. 2016) "Universal software radio peripheral," available online at: http://ettus.com", Apr. 2016.

"Encounternet (retrieved Jan. 2016) "The Encounternet Project," available online at: http://encounternet.net/", Jan. 2016.

"Federal Communications Commission (retrieved Jan. 2016) "41 dBu service contours around ASRN 1226015, FCC TV query database," available online at: http://transition.fcc.gov/fcc-bin/tvq?list=0&facid=69571", Jan. 2016.

"STMicroelectronics (Jul. 2012) "TS 881 Datasheet," 1 page", Jul. 2012.

Andrews, et al., A Passive Mixer-First Receiver With Digitally Controlled and Widely Tunable RF Interface, IEEE Journal of Solid-State Circuits, vol. 45, No. 12, Dec. 2010, p. 2696-2708.

Anthony,, Sebastian , ""Free energy harvesting from TV signals, to power a ubiquitous internet of things"", ExtremeTech, google search, Jul. 8, 2013, 8 pages, Jul. 8, 2013.

Bharadia, et al., "Backfi: High Throughput WiFi Backscatter". In Proceedings of the 2015 ACM Conference on Special Interest Group on Data Communication, Aug. 2015.

Bharadia, et al., ""Full duplex backscatter"", Proceedings of the 12th ACM Workshop on Hot Topics in Networks, Article No. 4, pp. 1-7, Nov. 2013.

Bharadia, et al., ""Full duplex radios"", Proceedings of the ACM SIGCOMM 2013 (SIGCOMM '13), pp. 375-386, Aug. 2013.

Bohorquez, et al., ""A 350 µW CMOS MSK transmitter and 400 µW OOK super-regenerative receiver for medical implant communications"", IEEE Journal of Solid-State Circuits, 44(4): 1248-1259, Apr. 2009.

Buettner, ""Backscatter Protocols and Energy-Efficient Computing for RF-Powered Devices"", PhD Thesis, University of Washington, Seattle, WA, 144 pages, Retrieved Jan. 2016., 2012.

Buettner, et al., ""Dewdrop: An energy-aware runtime for computational RFID"", Proceedings of the 8th USENIX Conference on Networked Systems Design and Implementation (NSDI'11), pp. 197-210, Mar. 2011.

Buettner, et al., ""RFID Sensor Networks with the Intel WISP"", Proceedings of the 6th ACM Conference on Embedded Network Sensor Systems (SenSys '08), pp. 393-394, Nov. 2008.

Chen, et al., Denis Guangyin Chen et al, "Pulse-Modulation Imaging—Review and Performance Analysis", IEEE Transactions on Biomedical Circuits and Systems, vol. 5, No. 1, Feb. 2011, at 64.

Chokshi, et al., "Yes! Wi-Fi and Bluetooth Can Coexist in Handheld Devices", Emerging and Embedded Business Unit, Marvell Semiconductor, Inc., Mar. 2010.

Dayhoff, ""New Policies for Part 15 Devices"", Federal Communications Commission (FCC) Telecommunications Certification Body Council (TCBC) Workshop 2005, 13 pages, May 2005.

Dementyev, et al., ""Wirelessly Powered Bistable Display Tags"", ACM International Joint Conference on Pervasive and Ubiquitous Computing (UbiComp '13), pp. 383-386, Sep. 2013.

Dementyev, A. et al., ""A Wearable UHF RFID-Based EEG System"", 2013 IEEE International Conference on RFID (RFID), pp. 1-7, Apr.-May 2013.

(56) References Cited

OTHER PUBLICATIONS

Duarte, et al., "'Full-duplex wireless communications using off-the-shelf radios: Feasibility and first results'", 2010 Conference Record of the 44th Asilomar Conference on Signals, Systems and Computers (ASILOMAR), pp. 1558-1562, Nov. 2010.

Duarte, "'Full-duplex Wireless: Design, Implementation and Characterization'", Ph.D. thesis, Rice University, 70 pages, Apr. 2012.

Duc, et al., "Enhancing Security of EPCGlobal Gen-2 RFID against Traceability and Cloning", Auto-ID Labs Information and Communication University, Auto-ID Labs White Paper No. WP-SWNET-016, 11 pages, Retrieved Jan. 2016, 2006 copyright.

Elliott, "'Average U.S. Home Now Receives a Record 118.6 TV Channels, According to Nielsen'", available online at http://www.nielsen.com/US/en/insights/pressroom/2008/average_u_s_home.html, Jun. 2008.

Ensworth, et al., "Every smart phone is a backscatter reader: Modulated backscatter compatibility with bluetooth 4.0 low energy (ble) devices". 2015 IEEE International Conference on RFID. (Retrieved Jul. 19, 2018).

Gorlatova, et al., "'Energy harvesting active networked tags (EnHANTs) for ubiquitous object networking'", IEEE Wireless Communications, 17(6):18-25, Dec. 2010.

Greene, et al., "Intel's Tiny Wi-Fi Chip Could Have a Big Impact". MIT Technology review, Sep. 21, 2012.

Guo, et al., "'Virtual full-duplex wireless communication via rapid on-off-division duplex'", 48th Annual Allerton Conference on Communication, Control, and Computing (Allerton), pp. 412-419, Sep.-Oct. 2010.

Jain, et al., "'Practical, real-time, full duplex wireless'", Proceedings of the 17th Annual International Conference on Mobile Computing and Networking (MobiCom'11), pp. 301-312, Sep. 2011.

Javed, et al., Sajid Javed et al., Background Subtraction Via Superpixel-Based Online Matrix Decomposition With Structured Foreground Constraints, ICCWW '15 Proceedings of the 2015 IEEE International Conference on Computer Vision Workshop, Dec. 2015.

Johnston, Scott , "Software Defined Radio Hardware Survey", Oct. 2011, 31 pgs.

Kellogg, et al., Passive Wi-Fi: Bringing Low Power to Wi-Fi Transmissions, Proceedings of the 13th USENIX Symposium on Networked Systems Design and Implementation, Mar. 2016, 15 pages.

Kellogg, et al., "'Bringing gesture recognition to all devices'", Proceedings of the 11th USENIX Conference on Network Systems Design and Implementation (NSDI'14), pp. 303-316, Apr. 2014.

Kellogg, et al., "Wi-Fi Backscatter: Internet Connectivity for RF-Powered Devices", University of Washington, SIGCOMM'14, Aug. 17-22, 2014.

Khannur, et al., "A Universal UHF RFID reader IC in 0.18-μm CMOS Technology". Solid-State Circuits, IEEE Journal of, 43(5):1146-1155, May 2008.

Kim, et al., "'Flush: a reliable bulk transport protocol for multihop wireless networks'", Proceedings of the 5th International Conference on Embedded Networked Sensor Systems (SenSys '07), pp. 351-365, Nov. 2007.

Kleinrock, et al., "'Packet Switching in Radio Channels: Part I—Carrier Sense Multiple-Access Modes and Their Throughput-Delay Characteristics'", IEEE Transactions on Communications, 23(12):1400-1416, Dec. 1975.

Kodialam, et al., "'Fast and reliable estimation schemes in RFID systems'", Proceedings of the 12th Annual International Conference on Mobile Computing and Networking (MobiCom '06), pp. 322-333, Sep. 2006.

Koomey, JG et al., "'Implications of Historical Trends in the Electrical Efficiency of Computing'", IEEE Annals of the History of Computing, 33(3):46-54, Aug. 2011.

Kuester, et al., "'Baseband Signals and Power in Load-Modulated Digital Backscatter," IEEE Antenna and Wireless Propagation Letter, vol. II, 2012, pp. 1374-1377, Nov. 2012."

Lazarus, , "'Remote, wireless, ambulatory monitoring of implantable pacemakers, cardioverter defibrillators, and cardiac resynchronization therapy systems: analysis of a worldwide database'", Pacing and Clinical Electrophysiology, 30(Suppl 1):S2-S12, Jan. 2007.

Liang, et al., "'Surviving wi-fi interference in low power zigbee networks'", Proceedings of the 8th ACM Conference on Embedded Networked Sensor Systems (SenSys '10), pp. 309-322, Nov. 2010.

Liu, et al., "'Ambient Backscatter: Wireless Communication out of Thin Air'", Proceedings of the Association for Computing Machinery (ACM) 2013 Conference on Special Interest Group on Data Communications (SIGCOMM), pp. 39-50, also in ACM SIGCOMM Communication Review, 43(4):39-50, Aug./Oct. 2013.

Liu, et al., "'Digital Correlation Demodulator Design for RFID Reader Receiver'", IEEE Wireless Communications and Networking Conference (WCNC2007), pp. 1666-1670, Mar. 2007.

Liu, et al., "'Enabling Instantaneous Feedback with Full-duplex Backscatter'", Proceedings of the 20th Annual International Conference on Mobile Computing and Networking (MobiCom'14), pp. 67-78, Sep. 2014.

Lu, et al., "Enfold: Downclocking OFDM in WiFi". In Proceedings of the 20th annual international conference on Mobile computing and networking, pp. 129-140. ACM, Sep. 2014.

Lu, et al., "Slomo: Downclocking WiFi Communication". In NSDI, pp. 255-258, Apr. 2013.

Mace, "'Wave reflection and transmission in beams'", Journal of Sound and Vibration, 97(2):237-246, Nov. 1984.

Manweiler, et al., "Avoiding the Rush Hours: Wifi Energy Management via Traffic Isolation". In MobiSys, Jul. 2011.

Marki, et al., Mixer Basics Primer: A Tutorial for RF & Microwave Mixers, Marki Microwave, Inc., 2010, 12 pages.

Mastrototaro, "'The MiniMed Continuous Glucose Monitoring System'", Diabetes Technology & Therapeutics, 2(Suppl 1):13-18, Dec. 2000.

Merritt, "Atheros targets cellphone with Wi-Fi chip", EE Times (Nov. 2, 2009), http://www.eetimes.com/document.asp?doc_id=1172134.

Metcalfe, et al., "'Ethernet: Distributed packet switching for local computer networks'", Communications of the ACM, 19(7):395-404, Jul. 1976.

Mishra, et al., "'Supporting continuous mobility through multi-rate wireless packetization'", Proceedings of the 9th Workshop on Mobile Computing Systems and Applications (HotMobile '08), pp. 33-37, Feb. 2008.

Mittal, et al., "Empowering developers to estimate app energy consumption", In MobiCom, Aug. 2012.

Murray Associates, , "The Great Seal Bug Part 1", Murray Associates, Mar. 2017.

Mutti, et al., "'CDMA-based RFID Systems in Dense Scenarios Concepts and Challenges'", 2008 IEEE International Conference on RFID, pp. 215-222, Apr. 2008.

Naderiparizi, et al., Saman Naderiparizi etal, "Ultra-Low-Power Wireless Streaming Cameras", arXiv:1707.08718v1, Jul. 27, 2017, Cornell University Library.

Navaneethan, et al., Navaneethan, VM. Security Enhancement of Frequency Hopping Spread Spectrum Based on Oqpsk Technique. IOSR Journal of Electronics and Communication Engineering. May 2016. 62.

Nikitin, et al., "'Passive tag-to-tag communication'", 2012 IEEE International Conference on RFID (RFID), pp. 177-184, Apr. 2012.

Nikitin, et al., "'Theory and measurement of backscattering from RFID tags'", IEEE Antennas and Propagation Magazine, 48(6):212-218, Dec. 2006.

Obeid, et al., "'Evaluation of spike-detection algorithms for a brain-machine interface application'", IEEE Transactions on Biomedical Engineering, 51 (6):905-911, Jun. 2004.

Occhiuzzi, et al., "'Modeling, Design and Experimentation of Wearable RFID Sensor Tag'", IEEE Transactions on Antennas and Propagation, 58(8):2490-2498, Aug. 2010.

Pandey, et al., "'A Sub-100 μW MICS/ISM Band Transmitter Based on Injection-Locking and Frequency Multiplication'", IEEE Journal of Solid-State Circuits, 46(5): 1049-1058, May 2011.

(56) References Cited

OTHER PUBLICATIONS

Parks, et al., ""A wireless sensing platform utilizing ambient RF energy"", 2013 IEEE Topical Conference on Biomedical Wireless Technologies, Networks, and Sensing Systems (BioWireleSS), pp. 154-156, Jan. 2013.
Parks, Aaron N. et al., "Turbocharging Ambient Backscatter Communication", SIGCOMM, Aug. 2014, 1-12.
Pillai, et al., ""An Uitra-Low-Power Long Range Battery/Passive RFID Tag for UHF and Microwave Bands With a Current Consumption of 700 nA at 1.5 V"", IEEE Transactions on Circuits and Systems I: Regular Papers, 54(7):1500-1512, Jul. 2007.
Proakis, et al., "Digital communications". 2005. McGraw-Hill, New York. (Retrieved Jul. 19, 2018).
Qing, et al., ""A folded dipole antenna for RFID"", IEEE Antennas and Propagation Society International Symposium, 1:97-100, Jun. 2004.
Rabaey, et al., ""PicoRadios for wireless sensor networks: the next challenge in ultra-low power design"", 2002 IEEE International Solid-State Circuits Conference, Digest of Technical Papers (ISSCC), 1:200-201, Feb. 2002.
Ransford, et al., ""Mementos: system support for long-running computation on RFID-scale devices"", ACM SIGPLAN Notices—Proceedings of the 16th International Conference on Architecturia Support for Programming Languages and Operating Systems (ASPLOS '11), 46(3):159-170, Mar. 2011.
Rao, KVS et al., ""Antenna design for UHF RFID tags: a review and a practical application"", IEEE Transactions on Antennas and Propagation, 53(12):3870-3876, Dec. 2005.
Rattner, et al., "Connecting the Future: It's a Wireless World", Sep. 2013.
Roy, et al., ""RFID: From Supply Chains to Sensor Nets"", Proceedings of the IEEE, 98(9): 1583-1592, Jul. 2010.
Sample, et al., ""Design of an RFID-Based Battery-Free Programmable Sensing Platform"", IEEE Transactions on Instrumentation and Measurement, 57(11):2608-2615, Nov. 2008.
Sample, et al., ""Experimental results with two wireless power transfer systems"", IEEE Radio and Wireless Symposium (RAWCON), pp. 16-18, Jan. 2009.
Seigneuret et al., ""Auto-tuning in passive UHF RFID tags"", 2010 8th IEEE International NEWCAS Conference (NEWCAS), pp. 181-184, Jun. 2010.
Sen, et al., ""CSMA/CN: Carrier sense multiple access with collision notification"", Proceedings of the 16th Annual International Conference on Mobile Computing and Networking (MobiCom'10), pp. 25-36, Sep. 2010.
Smith, Jr et al., ""A wirelessly-powered platform for sensing and computation"", ACM international Joint Conference on Pervasive and Ubiquitous Computing (UbiComp 2006), 4206:495-506, Sep. 2006.
So, et al., ""Multi-channel mac for ad hoc networks; handling multi-channel hidden terminals using a single transceiver"", Proceedings of the 5th ACM International Symposium on Mobile Ad Hoc Networking and Computing, pp. 222-233, May 2004.
Srinivasan, et al., ""An empirical study of low-power wireless"", ACM Transactions on Sensor Networks (TOSN), vol. 6, issue 2, Article No. 16, Feb. 2010.
Talla, et al., Hybrid Analog-Digital Backscatter: A New Approach for Battery-Free Sensing, IEEE international Conference on RFID, May 2013, 8 pages.
Thomas, et al., ""A 96 Mbit/sec, 15.5 pJ/bit 16-QAM modulator for UHF backscatter communication"", 2012 IEEE International Conference on RFID (RFID), IEEE RFID Virtual Journal, pp. 185-190, Apr. 2012.
Tubaishat, et al., ""Sensor networks: an overview"", IEEE Potentials, 22(2):20-23, Apr.-May 2003.
Walden, ""Analog-to-digital converter survey and analysis"", IEEE Journal on Selected Areas in Communications, 17(4):539-550, Apr. 1999.

Welbourne, et al., ""Building the Internet of Things Using RFID: The RFID Ecosystem Experience"", IEEE Internet Computing, 13(3):48-55, May-Jun. 2009.
Wuu, et al., ""Zero-Collision RFID Tags Identification Based on CDMA'"", 5th International Conference on Information Assurance and Security (IAS '09), pp. 513-516, Aug. 2009.
Yi, et al., ""Analysis and Design Strategy of UHF Micro-Power CMOS Rectifiers for Micro-Sensor and RFID Applications"", IEEE Transactions on Circuits and Systems I: Regular Papers, 54(1):153-166, Jan. 2007.
Ying, et al., "A System Design for UHF RFID Reader". In Communication Technology, 2008. ICCT 2008. 11th IEEE International Conference on, pp. 301-304. IEEE, Nov. 2008.
Zalesky, et al., ""Integrating segmented electronic paper displays into consumer electronic devices"", 2011 IEEE International Conference on Consumer Electronics (ICCE), pp. 531-532, Jan. 2011.
Zhang, et al., ""Frame retransmissions considered harmful: improving spectrum efficiency using micro-ACKs"", Proceedings of the 18th Annual International Conference on Mobile Computing and Networking (MobiCom '12), pp. 89-100, Aug. 2012.
Zhang, et al., "EkhoNet: High Speed Ultra Low-power Backscatter for Next Generation Sensors", School of Computer Science, University of Massachusetts, Amherst, MA 01003, Sep. 2014.
65 nm Technology by TSMC, http://www.tsmc.com/english/dedicatedFoundry/technology/65nm.htm, Accessed: Mar. 2017.
915mhz Whip, Straight RF Antenna by Nearson. ftp://ftp2.nearson.com/Drawings/Antenna/S463XX-915.pdf, Feb. 2006.
A 5.1-µW UHF RFID Tag Chip Integrated With Sensors for Wireless Environmental Monitoring, Proceedings of ESSCIRC, Sep. 2005, p. 279-282.
ADG904 by Analog Devices, https://www.analog.com/media/en/technical-documentation/data-sheets/ADG904.pdf, Feb. 2016.
Altera's Cyclone V FPGAS, https://www.altera.com/products/fpga/cycloneseries/cyclone-v/overview.html, Accessed: Feb. 11, 2020.
AN1200.22 LoRa Modualtion Basics, www.semtech.com, May 2015.
ATMEL 9399 ATA8520D Sensitivity Measurment, http://www.atmel.com/Images/Atmel-9399-ATA8520-Sensitivity-Measurement_Appiication-Note.pdf, Oct. 2015.
Cadence Spectre RF, http://www.cadence.com/products/rf/spectre_rf_simulation/pages/default.aspx, Accessed: Mar. 2017.
CC2630 Simplelink 6LoWPAN, ZIGBEE Wireless MCU, Texas Instruments, http://www.ti.com/lit/ds/symlink/cc2630.pdf, Jul. 2016.
CC2640 Simplelink Bluetooth Wireless MCU, Texas Instruments, http://www.ti.com/lit/ds/symlink/cc2640.pdf, Jul. 2016.
CC3200 Simplelink Wifi and Internet-of-Things Solution, A Single-Chip Wireless MCU, http://www.ti.com/product/CC3200/samplebuy, Feb. 2017.
CC3200 Simplelink Wifi and Internet-of-Things Solution, a Single-Chip Wireless MCU, Texas Instruments, http://www.ti.com/lit/ds/symlink/cc3200.pdf, Feb. 2015.
DC Ultra: Concurrent Timing, Area, Power, and Test Optimization, http://www.synopsys.com/Tools/Implementation/RTLSynthesis/DesignCompiler/Pages/default.aspx, Synopsys, 2019, 2 pages.
DE0-CV Development Kit, terasIC, http://www.terasic.com.tw/cgi-bin/page/archive.pl?Language=English&CategoryNo=163&No=921&Part No=2, Accessed: Feb. 2020.
Deep Space Network, NASA Jet Propulsion Laboratory, California Institute of Technology, http://deepspace.jpl.nasa.gov, Accessed Feb. 2020.
EFL 700A39 Stmicroelectronics, Battery Products, Digikey, https://www.digikey.com/product-detail/en/stmicroelectronics/EFL700A39/497-15109-ND/5052990.
Flexible, Printed and Thin Film Batteries 2019-2029 IDTECHEX, www.idtechex.com/en/research-report/flexible-printed-and-thin-film-batteries-2019-2029/634, Accessed: Feb. 11, 2020.
High Ionic Conductivity, https://www.brightvolt.com/our-technology/, Accessed: Feb. 11, 2020.
How Much Does an RFID Tag Cost Today?, RFID Journal, https://www.rfidjournal.com/faq/show?85, Feb. 2016.
Intel Cyclone V FPGAS, https://www.intel.com/content/www/us/en/products/programmable/fpga/cyclone-v.html, Accessed: Feb. 11, 2020.

(56) References Cited

OTHER PUBLICATIONS

Lora Alliance, https://www.lora-alliance.org/, Feb. 2016.
LTE Evolution for IOT Connectivity, http://resources.nokia.com/asset/200178, Nokia, Jul. 2016.
National Instruments: What is Labview?, https://www.ni.com/en-us/shop/labview.html, Accessed: Feb. 2020.
Nearson Inc. S463AH-915, https://www.digikey.com/product-detail/en/nearson-inc/S463AH-915/730-1052-ND/4571854, Accessed Feb. 2020.
Semtech SX1276IMLTRT, https://www.mouser.com/ProductDetail/Semtech/SX1276/MLTRT?qs=rB WM4%252BvDhiceYQoeMKd%2FQQ%3D%3D, Mouser Electronics, 2016.
Sigfox Developers, https://www.sigfox.com/en/sigfox-developers, Sigfox, 2010.
Sigfox Products, https://radiocrafts.com/products/sigfox/#Documentation, Radiocrafts Embedded Wireless Solutions, 2017.
Sigfox Vs. Lora: A Comparison Between Technologies & Business Models, LinkLabs, May 2018, 15 pages.
The Alien Technology ALN-9640 Squiggle is a High-Performance General-Purpose RFID Inlay for Use in a Wide Variety of Applications, www.alientechnology.com, Feb. 7, 2014.
TI CC2650, http://www.digikey.com/product-detail/en/CC2650F128RHBR/CC2650F128RHBR-ND/5189550, Digi-Key Electronics, 2019.
USB-6361 Multifunction I/O Device, http://sine.ni.com/nips/cds/view/p/lang/en/nid/209073, National Instruments, 2015.
"6-dBi Gain Patch Antenna", https://www.arcantenna.com/index.php/product_documents/get/document/id/492/, Accessed: Mar. 2017.
"A9 4K Ultra HD Camera SOC", http://www.ambarella.com/uploads/docs/A9-product-brief.pdf, Accessed: Apr. 2020.
"ADG919 RF Switch", Analog Devices, http://www.analog.com/media/en/technical-documentation/data-sheets/ADG918_919.pdf, Accessed Mar. 2017.
"ALEXA—Top Sites in the United States", http://www.alexa.com/topsites/countries/US. Loaded Jan. 13, 2015.
"Barker Code", http://mathworld.wolfram.com/BarkerCode.html, Accessed Sep. 2017.
"BQ25570 Nano Power Boost Charger and Buck Converter for Energy Harvester Powered Applications", Texas Instruments, http://www.ti.com/lit/ds/symlink/bq25570.pdf, revised Mar. 2019, 1-45.
"Centeye Stonyman Image Sensor Datasheet", http://www.centeye.com/products/ current-centeye-vision-chips/, Accessed Mar. 2017.
"Chip Inductors—0402 HP Series (1005)", Coilcraft, http://www.coilcraft.com/pdfs/0402hp.pdf, revised Oct. 3, 2018.
"Cota: Real Wireless Power", Cota by Ossia, http://www.ossiainc.com/, Accessed: Apr. 2020.
"Digipoints Series vol. 1 Leader Guide Module 9—Network Architectures", http://www.scte.org/SCTE/Resources/DigiPoints_Volume_1.aspx, Accessed Jun. 17, 2018, 8.12, 8.15, last bullet point.
"ELISA-3 Robot", http://www.gctronic.com/ doc/index.php/Elisa-3, Accessed Mar. 2017.
"Grey Scale Ramp", https://jackelworthyproject.files.wordpress.com/2015/01/greyscaleramp.png, Dec. 11, 2019.
"Head Jack Pluggable RFID Reader for Smartphones", http://www.rfidtagworld.com/product s/Ear-Jack-reader-UHF_1056.html, Accessed: Apr. 2020.
"Igloo Nano Low Power Flash FPGAS With Flash Freeze Technology", . https://www.microsemi.com/documentportal/doc_view/130695-ds0110-igloonano-low-power-flash-fpgasdatasheet, accessed Mar. 2017.
"LMV7219 Comparator", http://www.ti.com/lit/ds/symlink/lmv7219.pdfl, accessed Sep. 2017.
"NCX22001 Low Power Comparator Datasheet", http://www.nxp.com/documents/data_sheet/NCX2200.pdf. Accessed Mar. 2017.
"PHANTOMJS—Scriptable Headless Browser", http://phantomjs.org/, loaded Jan. 14, 2015.
"RF5110 Amplifier", http://www.rfmd.com/store/downloads/dl/file/id/30508/ 5110g_product_data_sheet.pdf, Accessed Mar. 2017.
"Ring Video Doorbell", https://ring.com/, Accessed Mar. 2017.
"S-882Z Series: Ultra-Low Volatage Operation Charge Pump IC for Step-Up DC-DC Converter Startup", Seiko Instruments Inc, http://www.eetchina.com/ARTICLES/2006MAY/PDF/S882Z_E.pdf, Accessed: Apr. 2020.
"SIT8021AI Oscillator Datasheet", https://www.sitime.com/products/datasheets/sit8021/SiT8021-datasheet.pdf, Accessed Mar. 2017.
"SMS7630-061: Surface-Mount, 0201 Zero Bias Silicon Schottky Detector Diode", Skyworks.
http://www.skyworksinc.com/uploads/documents/SMS7630_061_201295 G.pdf, Jul. 26, 2019.
"Synopsys Design Complier", http://www.synopsys.com/Tools/Impiementation/RTLSynthesis/ DesignCompiler/Pages/default.aspx, Jan. 13, 2018.
"USRP X-300", https://www.ettus.com/ product/details/X300-KIT, Accessed Mar. 2017.
"WATTUP—Wireless Charging 2.0", Energous Overview, http://www.energous.com/overview/, Accessed: Apr. 2020.
"WISP 5 PLATFORM", http: //wisp5.wikispaces.com/WISP+Home, Accessed Mar. 2017.
Afsah, Ali et al., A Low-Power Single-Weight-Combiner 802.11 abg SoC in 0.13 μm CMOS for Embedded Applications Utilizing an Area and Power Efficient Cartesian Phase Shifter and Mixer Circuit, IEEE Journal of Solid-State Circuits, vol. 43, No. 5, May 2008.
Bandodkar, J. A. et al., Non-Invasive Wearable Electrochemical Sensors: A Review, Trends in in Biotechnology, Jul. 2014, vol. 32, No. 7, p. 363-371.
Bary, Emily, "Snapchat Spectacles Review: The Good, the Bad, the Revolutionary", http://www.barrons.com/articles/snapchat-spectacles-review-the-good-the-bad-the-revolutionary-1487846715, dated Dec. 12, 2019.
Beard, Randall H. et al., "Using Wearable Video Technology To Build a Point-of-View Surgical Education Library", JAMA Surgery, vol. 151, No. 8, Aug. 2016, 771-772.
Ben-Jabeur, T. et al., Enhancing Passive UHF RFID Backscatter Energy Using Chirp Spread Spectrum.
Signals and Channel Shortening, IEEE Wireless Conference and Networking Conference, Apr. 2016.
Berni, J. A. et al., On the Utility of Chirp Modulation for Digital Signaling, IEEE Transactions on Communications, 21 (6): 748-751, Jun. 1973.
Best, S.R. et al., "A Tutorial on the Receiving and Scattering Properties of Antennas", IEEE Antennas and Propagation Magazine, vol. 51, Issue 5, Oct. 2009, 26-37.
Bharadia, Dinesh et al., Backfi: High Throughput WiFi Backscatter, SigComm, Aug. 2015, p. 283-296.
Bourzac, Katherine, Graphene Temporary Tattoo Tracks Vital Signs, https://spectrum.ieee.org/nanoclast/semiconductors/nanotechnology/graphene-temporary-tattoo, IEEE Spectrum's Nanotechnology Blog, Jan. 11, 2017, 2 pages.
Brandl, Martin et al., Long Range RFID Position Estimation for Applications in the Health Care System, IEEE 16th International Conference on e-Health Networking, Applications and Services (Healthcom), Oct. 2014, 2 pages.
Chawla, Vipul et al., An Overview of Passive RFID, IEEE Applications & Practice, Sep. 2007.
Chen, Guangyin D. et al., "Pulse-Modulation Imaging—Review and Performance Analysis", IEEE Transactions on Biomedical Circuits and Systems, vol. 5, No. 1, Feb. 2011, 64-82.
Chen, Long et al., "A 0.7-V 0.6-μw 100-kS/s Low-Power SAR ADC With Statistical Estimation-Based Noise Reduction", IEEE Journal of Solid-State Circuits, vol. 52, Issue 5, May 2017, 1388-1398.
Chen, Tzung-Ming et al., A Low-Power Fullband 802.11a/b/g WLAN Transceiver With On-Chip PA, IEEE Journal of Solid-State Circuits vol. 42, No. 2, Feb. 2007.
Clarke, Ruthbea, Smart Cities and the Internet of Everything: The Foundation for Delivering Next-generation Citizen Services, https://www.cisco.com/c/dam/en_us/solutions/industries/docs/scc/ioe__citizen_svcs_white_paper_ide_2013.pdf, IDC Government Insights, Oct. 2013.
Consortium, W.P., "Qi Wireless Power Specification", Introduction to the Power Class 0 Specification, Version 1.2.3, Feb. 2017.
Covic, Grant A. et al., "Inductive Power Transfer", Proceedings of the IEEE, vol. 101, No. 6, Jun. 2013, 1276-1289.

(56) References Cited

OTHER PUBLICATIONS

Curty, J.-P. et al., "Remotely Powered Addressable UHF RFID Integrated System", IEEE Journal of Solid-State Circuits, vol. 40, No. 11, Nov. 2005.

Dayhoff, Steven , New Policies for Part 15 DEVICES, Federal Communications Commission Office of Engineering and Technology Laboratory Division TCBC Workshop, https://transition.fcc.gov/oet/ea/presentations/files/may05/New_Policies_Pt._15_SD.pdf, May 2005, 13 pages.

Ensworth, Joshua F. et al., Every Smart Phone is a Backscatter Reader: Modulated Backscatter Compatibility With Bluetooth 4.0 Low Energy (BLE) Devices, IEEE International Conference on RFID, Apr. 2015.

Ensworth, Joshua F. et al., "Waveform-Aware Ambient RF Energy Harvesting", IEEE International Conference on RFID, Apr. 8-10, 2014, 67-73.

Fuller, S.B. et al., "Controlling Free Flight of a Robotic Fly Using an Onboard Vision Sensor Inspired by Insect Ocelli", Journal of the Royal Society Interface, 11(97):20140281, received Mar. 17, 2014.

Gollakota, Shyamnath et al., "Secure In-Band Wireless Pairing", Proceedings of the 20th USENIX Conference on Security, Aug. 2011, 16 pages.

Gudan, Kenneth et al., "Ultra-Low Power 2.4GHz RF Energy Harvesting and Storage System With -25dBm Sensitivity", IEEE International Conference on RFID, Apr. 15-17, 2015.

Hagerty, Joseph A. et al., "Recycling Ambient Microwave Energy With Broad-Band Rectenna Arrays", IEEE Transactions on Microwave Theory and Techniques, vol. 52, No. 3, Mar. 2004.

Hambeck, Christian et al., A2.4 µW Wake-Up Receiver for Wireless Sensor Nodes With -71 dBm SENSITIVITY, 2015 IEEE Topical Conference on Wireless Sensors and Sensor Networks (WiSNet), Jan. 2015, pp. 534-537.

Hanson, S. et al., "A 0.5 V Sub-Microwatt CMOS Image Sensor With Pulse-Width Modulation Read-Out", IEEE Journal of Solid-State Circuits, vol. 45, Issue 4, Mar. 2010, 759-767.

Hawkes, Allen M. et al., "A Microwave Metamaterial With Integrated Power Harvesting Functionality", Applied Physics Letters 103, 163901, Oct. 2013.

He, Dr. Xiaoxi , Flexible, Printed and Thin Film Batteries 2019-2029, http://www.idtechex.com/en/research-report/flexible-printed-and-thin-film-batteries-2019-2029/634, Sep. 2018, 16 pages.

Hu, Pan et al., Laissez-Faire: Fully Asymmetric Backscatter Communication. Sigcomm, Aug. 2015, pp. 255-267.

Iyer, Vikram et al., Inter-Technology Backscatter: Towards Internet Connectivity for Inmplanted Devices, Sigcomm, Aug. 2016.

Jadidian, Jouya et al., "Magnetic MIMO: How to Charge Your Phone in Your Pocket", MobiCom, The 20th Annual International conference on Mobile Computing and Networking, Sep. 7-11, 2014.

Javed, Sajid et al., "Background Subtraction Via Superpixel-Based Online Matrix Decomposition With Structured Foreground Constraints", ICCVW '15 Proceedings of the 2015 IEEE International Conference on Computer Vision Workshop (ICCVW), Dec. 2015, DOI 10.1109/ICCVW.2015.123, p. 1, Second Column, Third Paragraph.

Jeremy, Gummeson et al., FLIT: A Bulk Transmission Protocol for RFID-Scale Sensors, 10th International Conference on Mobile Systems, Applications, and Services, MobiSys '12, Jun. 2012, pp. 71-83.

Kapucu, Kerem et al., "A Passive UHF RFID System With a Low-Power Capacitive Sensor Interface", 2014 IEEE RFID Technology and Applications Conference (RFID-TA), Sep. 8-9, 2014, 301-305.

Kawahara, Yoshihiro et al., "Power Harvesting From Microwave Oven Electromagnetic Leakage", UbiComp '13, Session: Hardware, Sep. 8-12, 2013, Zurich, Switzerland, 373-381.

Kawahara, Yoshihiro et al., "Sensprout: Inkjet-Printed Soil Moisture and Leaf Wetness Sensor", UbiComp '12, Sep. 5-8, 2012, Pittsburgh, USA, 545.

Kellogg, Bryce et al., "Bringing Gesture Recognition to All Devices", Proceedings of the 11th USENIX Symposium on Networked Systems Design and Implementation (NSDIm'14), Apr. 2-4, 2014, Seattle,WA, USA, 303-316.

Kellogg, Bryce et al., "Wi-Fi Backscatter: Internet Connectivity for RF-Powered Devices", SIGCOMM '14, Aug. 17-22, 2014, Chicago, IL, USA.

Kester, Walt , "Understand SINAD, ENOB, SNR, THD, THD + N, and SFDR so You Don't Get Lost in the Noise Floor", MT-003 Tutorial, https://www.analog.com/media/en/training-seminars/tutorials/MT-003.pdf, Jan. 2009.

Kimionis, John , Bistatic Scatter Radio for Increased-Range Environmental Sensing, Technical University of Crete, A Thesis Submitted in Partial Fulfillment of the Requirements for the Master of Science of Electronic and Computer Engineering, Aug. 2013.

Kurs, André et al., "Wireless Power Transfer Via Strongly Coupled Magnetic Resonances", Science Magazine, vol. 317, July 6, 2007, 83-86.

Lakdawala, Hasnain et al., A 32nm SoC With Dual Core Atom Processor and RF Wifi Transceiver, IEEE Journal of Solid-State Circuits, vol. 48, No. 1, Jan. 2013.

Lee, Chungyeol P. et al., A Multistandard, Multiband SOC With Integrated BT, FM, WLAN Radios and Integrated Power Amplifier, IEEE International Solid-State Circuits Conference, Feb. 2010.

Leñero-Bardallo, Juan A. et al., "A 3.6 µs Latency Asynchronous Frame-Free Event-Driven Dynamic-Vision-Sensor", IEEE Journal of Solid-State Circuits, vol. 46, No. 6, Jun. 2011, 1443-1455.

Liao, Yu-Te et al., A 3-µW CMOS Glucose Sensor for Wireless Contact-Lens Tear Glucose Monitoring, IEEE Journal of Solid-State Circuits, vol. 47, No. 1, Jan. 2012.

Likamwa, Robert et al., "Energy Characterization and Optimization of Image Sensing Toward Continuous Mobile Vision", Proceedings from the 11th Annual International Conference on Mobile Systems, Applications, and Services, Jun. 2013, 69-82.

Lingzhi, Fu et al., Collision Recovery Receiver for EPC GEN2 RFID Systems, IEEE International Conference on the Internet of things (IOT), Oct. 2012.

Liu, Vincent et al., "Ambient Backscatter: Wireless Communication out of Thin Air", SIGCOMM '13, Aug. 12-16, 2013, Hong Kong, China, 39-50.

Lohr, Steve , The Internet of Things and the Future of Farming, The New York Times, http://bits.blogs.nytimes.com/2015/08/03/the-internet-of-things-and-the-future-of-farming/?_r=0, Aug. 3, 2015, 6 pages.

Low, Zhen N. et al., "Design and Test of a High-Power High-Efficiency Loosely Coupled Planar Wireless Power Transfer System", IEEE Transactions on Industrial Electronics, vol. 56, No. 5, May 2009, 1801-1812.

Magno, Michele et al., "Adaptive Power Control for Solar Harvesting Multimodal Wireless Smart Camera", 2009 Third ACM/IEEE International Conference on Distributed Smart Cameras (ICDSC), Aug. 30-Sep. 2, 2009.

Mahdavifar, et al., Coding for Tag Collision Recovery, IEEE International Conference on RFID, Apr. 2015, 8 pages.

Malim, George , How IOT is Expanding Into Cosmetics and Medical Industries, http://www.iotglobalnetwork.com/iotdir/2016/03/22/how-iot-is-expanding-into-cosmetics-and-medical-industries-1203/, IoT Global Network, Mar. 22, 2016, 4 pages.

Mallik, Udayan et al., "Temporal Change Threshold Detection Imager", 2005 IEEE International Solid-State Circuits Conference (ISSCC 2005), Feb. 8, 2005, 362-363, 603.

Michel, Fridolin et al., "A 250mV 7.5 µW 61dB SNDR CMOS SC ΔΣ Modulator Using a Near-Threshold-Voltage-Biased CMOS Inverter Technique", 2011 IEEE International Solid-State Circuits Conference, Session 27, Feb. 20-24, 2011, 476-478.

Moore, Stephen , "Moving Camera on a Motorcycle Video Clip", YouTube, https://www.youtube.com/watch?v=sHj3xSG-R_E&t=376s, Uploaded Apr. 22, 2015.

Morra, James , IOT Devices and Wearables Push Development of Thin, Flexible Batteries, http://electronicdesign.com/power/iot-devices-and-wearables-push-development-thin-flexible-batteries, ElectronicDesign, Sep. 18, 2015, 4 pages.

(56) References Cited

OTHER PUBLICATIONS

Murmann, B., "ADC Performance Survey 1997-2019", http://web.stanford.edu/~murmann/adcsurvey.html. dated Dec. 12, 2019.
Naderiparizi, S. et al.. "Glimpse: A Programmable Early-Discard Camera Architecture for Continuous Mobile Vision", Proceedings from the 15th Annual International Conference on Mobile Systems, Applications, and Services, Jun. 19-23, 2017, 292-305.
Naderiparizi, S. et al., "Self-Localizing Battery-Free Cameras", Proceedings from 2015 ACM international Joint Conference on Pervasive and Ubiquitous Computing, Sep. 2015, 445-449.
Naderiparizi, S. et al., "WISPCAM: A Battery-Free RFID Camera", 2015 IEEE International Conference on RFID (RFID), Apr. 15-17, 2015.
Naderiparizi, S. et al., "WISPCAM: An RF-Powered Smart Camera for Machine Vision Applications", Proceedings from the 4th International Workshop on Energy Harvesting and Energy-Neutral Sensing Systems, Nov. 2016, 19-22.
Naderiparizi, Saman et al., "Battery-Free Connected Machine Vision With WISPCam", GetMobile, vol. 20, Issue 1, Jan. 2016, 10-13.
Naderiparizi, Saman et al., "Ultra-Low-Power Wireless Streaming Cameras", arXiv:1707.08718 [cs.ET] Jul. 27, 2017, Cornell University Library, Accessed Jun. 14, 2018.
Nakamoto, et al., A Passive UHF RF Identification CMOS Tag IC Using Ferroelectric RAM In 0.35-μM Technology, IEEE Journal of Solid-State Circuits, vol. 42, No. 1, Jan. 2007.
Nathawad, et al., An IEEE 802.11a/b/g SoC for Embedded WLAN Applications, IEEE International Solid-State Circuits Conference, Feb. 2006, 10 pages.
Navaneethan, V.M., "Security Enhancement of Frequency Hopping Spread Spectrum Based on OQPSK Technique", IOSR Journal of Electronics and Communication Engineering, ICEICT 2016, e-ISSN: 2278-2834, p-ISSN: 2278-8735, abstract; p. 62, fourth and fifth paragraphs, p. 63, sixth paragraph p. 67, second paragraph, 62-70.
Nayar, S.K. et al., "Towards Self-Powered Cameras", 2015 IEEE International Conference on Computational Photography (ICCP), Apr. 24-26, 2015, 1-10.
Nelson, G.M. et al., "Design and Simulation of a Cockroach-Like Hexapod Robot", Proceedings from the 1997 IEEE International Conference on Robotics and Automation, vol. 2, Apr. 25, 1997, 1106-1111.
Nikitin, P.V. et al., "Differential RCS of RFID Tag", Electronics Letters, vol. 43, Issue 8, Apr. 12, 2007.
Nikitin, P.V. et al., "Theory and Measurement of Backscattering From RFID Tags", IEEE Antennas and Propagation Magazine, vol. 48, Issue 6, Dec. 2006, 212-218.
Olgun, U. et al., "Design of an Efficient Ambient Wifi Energy Harvesting System", IET Microwaves. Antennas & Propagation, vol. 6, Iss. 11, Mar. 2012, 1200-1206.
Olgun, Ugur et al., "Efficient Ambient Wifi Energy Harvesting Technology and Its Applications", 2012 IEEE Antennas and Propagation Society International Symposium, Jul. 8-14, 2012.
Olgun, Ugur et al., "Wireless Power Harvesting With Planar Rectennas for 2.45 GHz RFIDs", 2010 URSI International Symposium on Electromagnetic Theory, Aug. 16-19, 2010, 3229-331.
Ou, et al., Come and Be Served: Parallel Decoding for Cots RFID Tags, MobiCom'15, Sep. 2015, 12 pages.
Pandey, et al., A Fully Integrated RF-Powered Contact Lens With a Single Element Display, IEEE Transactions on Biomedical Circuits and Systems, vol. 4, No. 6, Dec. 2010.
Pantelopoulos, et al., A Survey on Wearable Sensor-Based Systems for Health Monitoring and Prognosis, IEEE Transactions on Systems, Man, and Cybernetics—Part C: Applications and Reviews, vol. 40, No. 1, Jan. 2010.
Parks, Aaron N., "A Wireless Sensing Platform Utilizing Ambient RF Energy", 2013 IEEE Topical Conference on Biomedical Wireless Technologies, Networks, and Sensing Systems, Jan. 20-23, 2013.
Perez-Penichet, et al., Augmenting IoT Networks With Backscatter-Enabled Passive Sensor Tags, HotWireless'16, Oct. 2016, 5 pages.

Roberts, et al., A 98nW Wake-Up Radio for Wireless Body Area Networks, IEEE Radio Frequency Integrated Circuits Symposium, Jun. 2012, 4 pages.
Ru, et al., A Discrete-Time Mixing Receiver Architecture With Wideband Harmonic Rejection, IEEE International Solid-State Circuits Conference, Feb. 2008, 3 pages.
Rubenstein, M. et al., "Programmable Self-Assembly in a Thousand-Robot Swarm", Science, vol. 345, Issue 6198, Aug. 2014, 795-799.
Sakurai, et al., A 1.5GHZ-Modulation-Range 10MS-Modulation-Period 180KHZRMS-Frequency-Error 26MHZ-Reference Mixed-Mode FMCW Synthesizer for MM-Wave Radar Application, IEEE International Solid-State Circuits Conference, Feb. 2011, 3 pages.
Sample, Alanson et al., "Experimental Results With Two Wireless Power Transfer Systems", Proceedings of the 4th international conference on Radio and Wireless Symposium, Jan. 2009.
Sample, Alanson P. et al., "Design of an RFID-Based Battery-Free Programmable Sensing Platform", IEEE Transactions on Instrumentation and Measurement, vol. 57, No. 11, Nov. 2008.
Sarpeshkar, Rahul, "Analog Versus Digital Extrapolating From Electronics to Neurobiology", Neural Computation, vol. 10, Issue 7, Mar. 1998, 1601-1638.
Scott, Michael D. et al., "An Ultra-Low Power ADC for Distributed Sensor Networks", Proceedings of the 28th European Solid-State Circuits Conference, Oct. 2002, 255-258.
Shafik, R.A. et al., "On the Error Vector Magnitude as a Performance Metric and Comparative Analysis", 2006 International Conference on Emerging Technologies, Nov. 13-14, 2006, 27-31.
Smiley, Suzanne, Active RFID Vs. Passive RFID: What's the Difference?, https://blog.atlasrfidstore.com/active-rfid-vs-passive-rfid, RFID Insider, Mar. 2016, 26 pages.
Souppouris, Aaron, "This Router Can Power Your Devices Wirelessly From 15 Feet Away", Energous Wattup Demo, Engadget, http://www.engadget.com/2015/01/05/ energous-wattup-wireless-charging-demo/, Jan. 5, 2015.
Swider, Matt, "Snapchat Spectacles (2016) Review", http://www.techradar.com/ reviews/snap-spectacles, Dec. 12, 2019.
Talla, et al., Powering the Next Billion Devices With Wi-Fi, CoNEXT, Dec. 2015, 13 pages.
Talla, Vamsi et al., "Battery-Free Cellphone", PACM Interact. Mob. Wearable Ubiquitous Technol. 1, 2, Article 25, Jun. 2017.
Talla, Vamsi et al., "Lora Backscatter: Enabling the Vision of Ubiquitous Connectivity", Proceedings of the ACM on Interactive, Mobile, Wearable and Ubiquitous Technologies, vol. 1, No. 3, Article 105, Sep. 2017, 105:1-105:24.
Talla, Vamsi et al., "Wi-Fi Energy Harvesting for Battery-Free Wearable Radio Platforms", IEEE International Conference on RFID, Apr. 15-17, 2015, 47-54.
Tang, Fang et al., "AN 84 pW/Frame Per Pixel Current-Mode CMOS Image Sensor With Energy Harvesting Capability", IEEE Sensors Journal, vol. 12, No. 4, Apr. 2012, 720-726.
Thomas, et al., A 96 MBIT/SEC, 15.5 PJ/BIT 16-QAM Modulator for UHF Backscatter Communication, IEEE International Conference on RFID, Apr. 2012, 6 pages.
Trotter, Matthew S. et al., "Power-Optimized Waveforms for Improving the Range and Reliability of RFID Systems", 2009 IEEE International Conference on RFID, Apr. 27-28, 2009.
Trotter, Matthew S., "Survey of Range Improvement of Commercial RFID Tags With Power Optimized Waveforms", IEEE RFID, Apr. 12-14, 2010, 195-202.
Valenta, Christopher R. et al., "Harvesting Wireless Power: Survey of Energy-Harvester Conversion Efficiency in Far-Field, Wireless Power Transfer Systems", IEEE Microwave Magazine, vol. 15, Issue 4, Jun. 2014, 108-120.
Varshney, et al., Lorea: A Backscatter Reader for Everyone!, arXiv.org, Nov. 2016, 15 pages.
Vera, Gianfranco A. et al., "Design of A 2.45 GHz Rectenna for Electromagnetic (EM) Energy Scavenging", 2010 IEEE Radio and Wireless Symposium (RWS), Jan. 10-14, 2010, 61-64.
Visser, Hubregt J. et al., "Ambient RF Energy Scavenging: GSM and WLAN Power Density Measurements", Proceedings of the 38th European Microwave Conference, Oct. 27-31, 2008.
Vougioukas, et al., Could Battery-Less Scatter Radio Tags Achieve 270-Meter Range?, IEEE, May 2016, 3 pages.

(56) References Cited

OTHER PUBLICATIONS

Wang, Anran et al., "FM Backscatter: Enabling Connected Cities and Smart Fabrics", NSDI'17, Proceedings of the 14th USENIX Conference on Networked Systems Design and Implementation, Mar. 2017, 243-258.
Waters, Benjamin H. et al., "Powering a Ventricular Assist Device (VAD) With the Free-Range Resonant Electrical Energy Delivery (Free-D) System", Proceedings of the IEEE, vol. 100, No. 1, Jan. 2012, 138-149.
Wei, et al., High-Efficiency Differential RF Front-End for a GEN2 RFID Tag, IEEE Transactions on Circuits and Systems—II: Express Briefs, vol. 58, No. 4, Apr. 2011, 6 pages.
Weldon, et al., A 1.75-GHz Highly Integrated Narrow-Band CMOS Transmitter With Harmonic-Rejection Mixers, IEEE Journal of Solid-State Circuits, vol. 36, No. 12, Dec. 2001.
Wu, et al., A 56.4-TO-63.4 GHz Multi-Rate All-Digital Fractional-N PLL for FMCW Radar Applications in 65 NM CMOS, IEEE Journal of Solid-State Circuits, vol. 49, No. 5, May 2014.
Yao, et al., A Contact Lens With Integrated Telecommunication Circuit and Sensors for Wireless and Continuous Tear Glucose Monitoring, Journal of Micromechanics and Microengineering, Jun. 2012, 10 pages.
Yeager, et al., A 9 μA, Addressable GEN2 Sensor Tag for Biosignal Acquisition, IEEE Journal of Solid-State Circuits, vol. 45, No. 10, Oct. 2010, 12 pages.
Yehl, Kevin et al., "High-Speed DNA-Based Rolling Motors Powered By RNase H", Nature Nanotechnology 11(2), Feb. 2016, 184-190.
Yin, et al., A System-On-Chip EPC GEN-2 Passive UHF RFID Tag With Embedded Temperature Sensor, IEEE Journal of Solid-State Circuits, vol. 45, No. 11, Nov. 2010, 17 pages.
Zhang, et al., Enabling Bit-By-Bit Backscatter Communication in Severe Energy Harvesting Environments, Proceedings of the 11th USENIX Symposium on Networked Systems Design and Implementation, Apr. 2014, 14 pages.
Zhang, et al., Enabling Practical Backscatter Communication for On-Body Sensors, Sigcomm, Aug. 2016, 14 pages.
Zhang, et al., Hitchhike: Practical Backscatter Using Commodity Wifi, SenSys, Nov. 2016, 13 pages.
Zheng, et al., Read Bulk Data From Computational RFIDS, IEEE/ACM Transactions on Networking, vol. 24, No. 5, Oct. 2016.
EESR dated Dec. 9, 2020 for EP Application No. 18780354.9.
Chen, Denis et al., "Pulse-Modulation Imaging—Review and Performance Analysis", IEEE Transactions of Biomedical Circuits and Systems, vol. 5, No. 1, Feb. 2011.
Kim, Sangkil , et al., "Ambient RF Eneregy-Harvesting Technologies for Self-Sustainable Standalone Wireless Sensor Platforms.", Proceedings of the IEEE. vol 10, No. 11 Accessed on Oct. 8, 2021. http://tentzeris.ece.gatech.edu/Procs14_Sangkil.pdf (Year: 2014), Nov. 2014.

IMAGE AND/OR VIDEO TRANSMISSION USING BACKSCATTER DEVICES

CROSS-REFERENCE TO RELATED APPLICATION(S)

This application is a 35 U.S.C. § 371 National Stage Application of PCT Application No. PCT/US2018/026545, filed Apr. 6, 2018, which claims the benefit under 35 U.S.C. § 119 of the earlier filing date of U.S. Provisional Application Ser. No. 62/482,297 filed Apr. 6, 2017, the entire contents of which are hereby incorporated by reference, in their entirety, for any purposes.

STATEMENT REGARDING FEDERALLY SPONSORED RESEARCH OR DEVELOPMENT

This invention was made with government support under Grant Nos. CNS-1305072 and CNS-1407583 and CNS-1452494, awarded by the National Science Foundation. The government has certain rights in the invention.

TECHNICAL FIELD

Examples described herein relate generally to wireless communication. Examples of image and/or video transmission using backscatter devices are described.

BACKGROUND

Video streaming has traditionally been considered an extremely power-hungry operation. Existing approaches optimize the camera and communication modules individually to minimize their power consumption. However, designing a video streaming device requires power-consuming hardware components and computationally intensive video codec algorithms that interface the camera and the communication modules. For example, monochrome HD video streaming at 60 fps uses an ADC operating at a sampling rate of 55.3 MHz and a video codec that can handle uncompressed data that is being generated at 442 Mbps.

There has been recent interest in wearable cameras for applications ranging from life-casting, video blogging and live streaming concerts, political events and even surgeries. Unlike smartphones, these wearable cameras have a spectacle form-factor and hence need to be both ultra-light weight and have no heating issues during continuous operation. This has resulted in a trade-off between the usability of the device and its streaming abilities since higher resolution video streaming requires a bigger (and heavier) battery as well as power-consuming communication and processing units. For example, the Snap Spectacle is light-weight and usable but cannot stream live video and can record only up to one hundred 10-second videos (effectively below 20 minutes) on a single charge.

SUMMARY

Examples of apparatuses are described herein. An example apparatus includes an image sensor. The image sensor may provide signals indicative of energy incident on the image sensor. The apparatus may include a pulse width modulator, which may be coupled to the image sensor and may convert the signals indicative of energy incident on the image sensor into a pulse-containing waveform wherein widths of pulses in the pulse-containing waveform are indicative of the energy incident on the image sensor. The apparatus may include an antenna and a switch coupled to the pulse width modulator and the antenna. The switch may control an impedance at the antenna to backscatter a carrier signal incident on the antenna in accordance with the pulse-containing waveform.

In some examples, the image sensor may include a photo-diode and the signals indicative of energy incident on the image sensor comprise voltage signals.

In some examples, duty cycles of the pulses in the pulse-containing waveform are proportional with the voltage signals.

In some examples, the apparatus may further include a subcarrier modulator configured to up-convert the pulse-containing waveform using a frequency offset from the carrier signal.

In some examples, the image sensor comprises a camera configured to operate at a frame rate, and the pulse width modulator comprises a comparator, the comparator configured to receive a triangular wave at the frame rate and pixel values from the camera, the comparator configured to output a first value when a pixel value is less than the triangular wave and a second value when the pixel value is greater than the triangular wave.

In some examples, the image sensor comprises a camera and the signals indicative of energy incident on the image sensor comprise signals indicative of pixel values. The camera may provide signals indicative of pixel values in a zig-zag scan pattern.

In some examples, the image sensor may include a camera and the signals indicative of energy incident on the image sensor may comprise signals indicative of a super-pixel comprising average pixel values for sets of pixels in a frame.

Examples of systems are described herein. An example system may include an image sensor configured to provide signals having a property proportionate to pixel values of an image corresponding to energy incident on the image sensor. The system may include a backscatter transmitter configured to provide a backscatter signal by backscattering a carrier signal incident on the backscatter transmitter in accordance with the pixel values. The system may include a carrier signal source positioned to provide the carrier signal, and a receiver configured to receive the backscatter signal and decode the pixel values.

In some examples, the property may be a voltage. In some examples, the property may be a time duration.

In some examples, the system may include an energy harvesting system, and the backscatter transmitter may be configured to utilize energy from the energy harvesting system to backscatter the carrier signal.

In some examples, the energy harvesting system may provide sufficient energy to power the backscatter transmitter.

In some examples, the carrier signal source comprises a frequency hopped source.

In some examples, the image sensor includes a video camera and the backscatter signal is provided at a sufficient rate for real-time playback of video by the receiver.

In some examples, the carrier signal source may be further configured to provide commands to the backscatter transmitter, the image sensor, or combinations thereof.

In some examples, the backscatter transmitter is configured to convert the signals having the property proportionate to pixel values into a pulse-containing waveform, and pulsewidths in the pulse-containing waveforms may correspond with the pixel values.

In some examples, the backscatter transmitter is configured to provide the backscatter signal at a backscatter frequency, and the backscatter frequency is shifted from a frequency of the carrier signal.

In some examples, the backscatter signal comprises super-pixels, and the receiver is configured to compare multiple frames of super-pixels and request at least a portion of a complete frame when the multiple frames of super-pixels differ by greater than a threshold amount.

In some examples, the system may further include an additional backscatter transmitter, and the backscatter transmitter and the additional backscatter transmitter are configured to backscatter the carrier signal into different frequency bands.

Examples of methods are described herein. An example method may include providing a carrier signal, providing a pulse-containing signal having pulses whose widths correspond with pixel values, and backscattering the carrier signal in accordance with the pulse-containing signal to transmit image data.

In some examples, the carrier signal comprises a frequency-hopped signal. In some examples, the carrier signal comprises an ambient TV signal, WiFi signal, or combinations thereof.

In some examples, the method may further include modulating the pulse-containing signal using a security key. In some examples, the security key may include a pseudo-random sequence.

In some examples, providing the pulse-containing signal comprises utilizing a signal including analog representations of the pixel values. In some examples, the analog representations of the pixel values are provided in a zig-zag scan pattern. In some examples, providing the pulse-containing signal comprises combining the analog representations of the pixel values with a periodic waveform. In some examples, the periodic waveform comprises a triangle wave at a frame rate.

In some examples, backscattering the carrier signal comprises performing subcarrier modulation to shift a frequency of a backscatter signal from a frequency of the carrier signal.

In some examples, the method further includes pulse-width modulating a signal from an image sensor to provide the pulse-containing signal, and at least partially cancelling harmonic signals generated by said pulse-width modulating.

DETAILED DESCRIPTION

Figure 1:
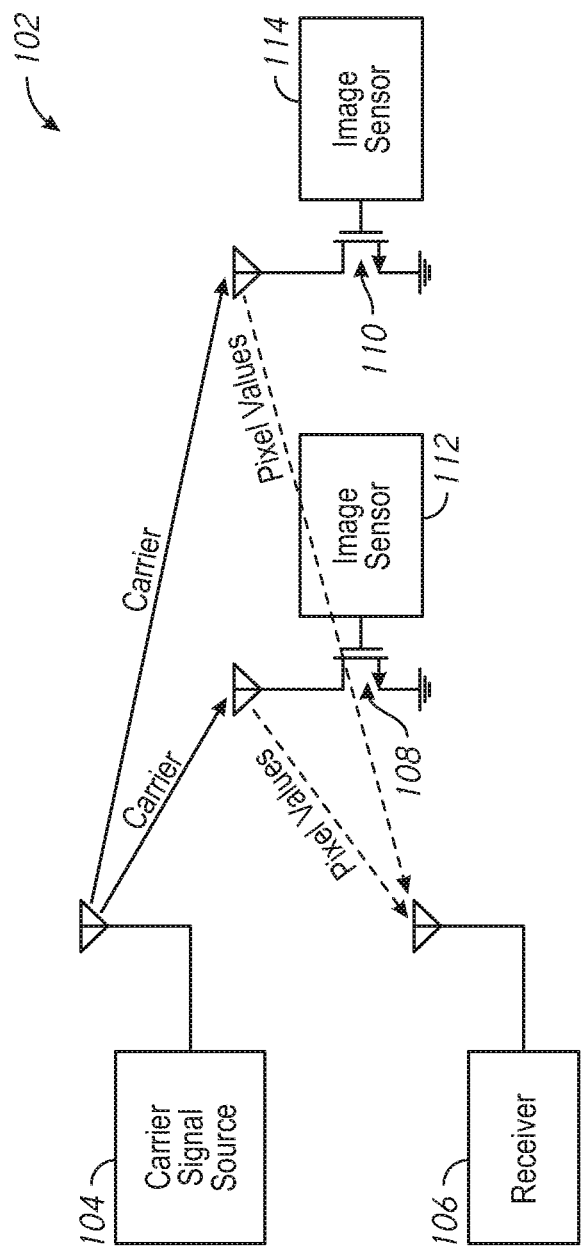
FIG. 1 is a schematic illustration of a system arranged in accordance with examples described herein.

Certain details are set forth below to provide a sufficient understanding of embodiments of the invention. However, it will be clear to one skilled in the art that embodiments of the invention may be practiced without various of these particular details. In some instances, well-known circuits, control signals, networking components, timing protocols, video encoding and/or compression techniques, and software operations have not been shown in detail in order to avoid unnecessarily obscuring the described embodiments of the invention.

Examples described herein include systems, devices, and methods that may provide HD video streaming from a low-power wearable camera to another. Analog video backscatter techniques may be used that provide signals having a property proportionate to pixel values from image sensor elements, such as photo-diodes, to the backscatter hardware. In this manner, power consuming hardware components such as ADCs and codecs may be reduced and/or eliminated.

Examples described herein may provide a low-power camera that can perform HD video streaming to a nearby mobile device such as a smart-phone. This may provide for a wearable camera that is light weight, streams high quality video, and is safe and comfortable to wear. For example, reducing the power consumption reduces the size of the required battery, which in turn may address key challenges of weight, battery life and overheating. Moreover, since users typically carry mobile devices like smartphones that are comparatively not as weight and power constrained, these devices may be used to receive the streamed video and/or relay the video to other systems, such as a cloud infrastructure.

To explain some challenges which may be involved, consider components of a video-streaming device: image sensor, video compression and communication. Image sensors may have optical lens(es), an array of photo-diodes connected to amplifiers and finally an ADC to translate the analog pixels into digital values. A video codec may then perform compression in the digital domain to produce compressed video, which may then be transmitted on a wireless medium. Existing approaches optimize the camera and communication modules individually to minimize their power consumption. However, designing a video streaming device requires power-consuming hardware components and video codec algorithms that interface the camera and the communication modules.

Table 1 shows examples of sampling rates and data rates for the ADC and video codec respectively. HD video streaming generally uses an ADC operating at a high sampling rate of more than at least 10 MHz. While the analog community has reduced the ADC power consumption at much lower sampling rates, state-of-the-art ADCs in the research community consume at least a few milliwatts at these high sampling rates. Additionally, the high data rate utilizes the oscillator and video codec running at high clock frequencies that proportionally increase the power consumption. Video codecs at these data rates accordingly typically consume 100s of milliwatts to a few watts of power.

TABLE 1

Raw Digital Video Sampling and Bitrate Requirement

| | Frame Rate: 60 fps | | Frame Rate: 30 fps | | Frame Rate: 10 fps | |
|---|---|---|---|---|---|---|
| Video Quality | Sampling Rate (MHz) | Data Rate (Mbps) | Sampling Rate (MHz) | Data Rate (Mbps) | Sampling Rate (MHz) | Data Rate (Mbps) |
| 1080 p (1920 × 1080) | 124.4 | 995.3 | 62.2 | 497.7 | 20.7 | 165.9 |
| 720 p (1280 × 720) | 55.3 | 442.4 | 18.4 | 221.2 | 9.2 | 73.7 |
| 480 p (640 × 480) | 18.4 | 147.4 | 9.2 | 73.7 | 3.1 | 24.58 |
| 360 p (480 × 360) | 10.4 | 82.9 | 5.2 | 41.5 | 1.7 | 13.8 |

Examples described herein may instead facilitate video streaming on low-power devices. Instead of independently optimizing the imaging and the communication components, examples described herein may jointly design these components to significantly reduce the system power consumption.

Examples described herein may provide signals have a property that is proportionate to pixel values (e.g., pixel brightness) from image sensing elements (e.g., photo-diodes) directly to a backscatter antenna for backscattering of pixel values (e.g., backscattering of image and/or video data). Note that this stands in contrast to a typical image sensor digital output. The digital output generally would include a multi-bit binary representation of pixel values. Signals having a property that is proportionate to pixel values provided herein instead may provide a property that varies in proportion to the pixel values. In this manner, a need for power-hungry ADCs, amplifiers, AGCs and/or codecs may be reduced or eliminated.

Generally, systems described herein may shift power-hungry analog-to-digital conversion operations to receivers. Because analog signals are more susceptible to noise than digital signals, examples described herein may split the analog to digital conversion (ADC) process into two phases, one that is performed at a backscatter transmitter (e.g., at a video camera), and one that is performed at the receiver (e.g., mobile device). At the backscatter transmitter (e.g., video camera), the analog pixel voltage may be converted into a pulse that is discrete in amplitude but continuous in time. This signal may be sent via backscatter from the backscatter transmitter to the receiver. Avoiding the amplitude representation in the wireless link may provide for better noise immunity. The receiver measures the continuous length pulse it receives to produce a binary digital value indicative of the original pixel value.

Examples described herein include providing pixel values directly to a backscatter transmitter without using ADCs. To do this, the analog pixel values may be transformed into pulses having different pulse widths using a pulse-width modulator. The pulse-width modulator may be implemented using a passive ramp circuit in some examples. The pulses are mapped back to pixel values at the receiver. Note that, while examples of pulse-width modulation and pulse-width modulators are described herein, other modulation techniques may additionally or instead be used to provide signals having a property proportionate to pixel values that may be used to control a switch of a backscatter transmitter. Examples of modulation techniques which may be used include, but are not limited to, pulse frequency modulation and/or amplitude modulation. In some examples, intra-frame compression may be provided by leveraging redundancy present in typical images. The bandwidth of the signal may be proportional to the rate of change across adjacent pixels and since videos tend to be redundant, the bandwidth of the analog signal may be inversely proportional to the redundancy in the frame. Thus, by transmitting pixels consecutively, examples described herein may perform compression and reduce the wireless bandwidth. In some examples, to achieve inter-frame compression, distributed algorithms are described that may reduce the data transmitted by the camera while delegating most of inter-frame compression functionality to the receiver. Generally then, the backscatter transmitter may perform averaging over blocks of nearby pixels in the analog domain and transmit these averaged values using backscatter hardware. The receiver may compare these averages with those from the previous frame and only requests the blocks that have seen a significant change in the average pixel value, thus reducing the transmission between subsequent video frames.

FIG. 1 is a schematic illustration of a system arranged in accordance with examples described herein. The system 102 includes carrier signal source 104, receiver 106, backscatter transmitter 108, image sensor 112, backscatter device 110, and image sensor 114. During operation, the carrier signal source 104 transmits a carrier signal. The backscatter transmitter 108 and/or backscatter transmitter 110 may backscatter the carrier signal into transmissions containing pixel values representative of energy incident on the image sensor 112 and/or image sensor 114, respectively. The transmissions from the backscatter transmitter 108 and/or backscatter transmitter 110 may be received by the receiver 106. In this manner, images and/or video may be transmitted (e.g., streamed) using low power backscatter transmission techniques. In some examples, the transmission may not require battery storage and may utilize harvested energy.

The carrier signal source 104 may be implemented using any electronic device capable of providing carrier signals. Examples of carrier signal sources include, but are not limited to, frequency generators, routers, mobile communications devices such as cell phones or tablets, computers, and/or laptops. The carrier signal source 104 may generally have a wired power source (e.g., it may be plugged in), although in some examples the carrier signal source 104 may be battery powered. Generally, the carrier signal source 104 may have sufficient power to generate the carrier signal. A single carrier signal source may provide a carrier signal to more than one backscatter transmitter as described herein. Although a single carrier signal source 104 is shown in FIG. 1, any number of carrier signal sources may be used in some examples. In some examples, the carrier signal source 104 may implement frequency hopping techniques—e.g., the carrier signal may be hopped. Accordingly, a frequency of the carrier signal may change over time in some examples. In some examples, the carrier signal may be a single frequency signal (e.g., a single tone signal). In some examples, the carrier signal may be a multi-frequency signal.

The carrier signal source 104 generally includes RF components, such as frequency synthesizer(s) and/or power amplifiers, which may then not be needed at the backscatter transmitter 108 and/or backscatter transmitter 110. In this manner the carrier signal source 104 may provide the RF functions for any number of backscatter devices, such as backscatter transmitter 108 and backscatter transmitter 110.

The carrier signal provided by the carrier signal source 104 may be any of a variety of wireless signals which may be backscattered by the backscatter transmitter 108 and/or backscatter transmitter 110 to form a backscatter signal including pixel values. The carrier signal may be a continuous wave or a protocol-specific carrier signal (e.g. a Bluetooth, Wi-Fi, ZigBee, and/or SigFox signal). In some examples, the carrier signal may be a spread spectrum signal. In some examples, the carrier signal may be a frequency hopped signal. In some examples, the carrier signal may be a continuous wave signal. In some examples, one or more characteristics of the continuous wave signal (e.g. the frequency, amplitude, and/or phase) may be selected in accordance with a particular wireless protocol and/or frequency and/or amplitude and/or phase that the receiver 106 is configured to receive. In some examples, the carrier signal may be a single-frequency tone signal. In some examples, the carrier signal may be an ambient signal.

Examples of ambient signals include a television (TV) broadcast signal, WiFi signal, cellular signal, or combinations thereof.

In some examples, the carrier signal may be a data-free signal. For example, data decodable by the receiver may not be encoded in the carrier signal. In some examples, the carrier signal may be implemented using a predetermined data signal. For example, the carrier signal may not be encoded with data that is not predetermined and/or generated at the carrier signal source 104. In some examples, the carrier signal may be a non-payload signal. For example, a data payload detectable by the receiver 106 may not be included in the carrier signal. In some examples, the carrier signal may include one or more commands. For example, the carrier signal source 104 may encode one or more commands in the carrier signal. The backscatter transmitters 108 and/or 110 (or another device coupled to the image sensors) may decode the commands which may be used, for example, to start and/or stop backscattering, and/or to turn the image sensors 112 and/or 114 on and/or off.

The backscatter transmitter 108 and backscatter transmitter 110 may be implemented in any devices desiring communication capability, such as, but not limited to, tags, mobile communication devices such as cell phones or tablets, computers, and/or laptops. Other devices may be implemented having backscatter communication capability, including but not limited to sensors, wearable devices such as cameras, video cameras, watches, eyeglasses, contact lenses, and/or medical implants. The backscatter transmitters may have a sufficiently small form factor and low power requirement as to be able to be incorporated in or attached to any object and provide communication functionality for the object and/or associated with the object. Although two backscatter transmitters are shown in FIG. 1, it is to be understood that any number of backscatter transmitters may be used, including one backscatter transmitter. In other examples, 10, 20, 30, 40, 50, 60, 70, 80, 90, 100 or more backscatter devices may be present in the system of FIG. 1.

Generally, backscatter transmitters, such as the backscatter transmitter 108 and backscatter transmitter 110 function to present varying impedance to a carrier signal such that, for example, the carrier signal is either reflected or absorbed by the backscatter transmitter at any given time. In this manner, for example a '1' may be indicated by reflection, and a '0' by absorption, or vice versa, and the carrier signal may be backscattered into a data-carrying signal. Accordingly, in some examples, a data-carrying signal may be provided through backscatter using only the energy required to alter an impedance at a backscatter transmitter's antenna. In this manner, the backscatter transmitters may transmit data-carrying signals at lower power than if the backscatter devices had themselves generated the carrier signals.

Backscatter transmitters described herein, such as backscatter transmitter 108 and backscatter transmitter 110 may generally be ultra-low power devices. For example, backscatter transmitters described herein may eliminate or reduce the need for power hungry communication components (e.g. RF signal generators, mixers, analog-to-digital converters, etc., which may be present in the carrier signal source 104). In this manner, backscatter transmitters described herein may consume microwatts of power to transmit data, which may improve the battery life of the component (e.g. camera) utilizing the communication capability of the backscatter transmitter. Backscatter transmitters may perform digital baseband operations, such as coding and/or modulation.

The backscatter signal backscattered by the backscatter transmitter 108 and/or backscatter transmitter 110 may be a signal produced using subcarrier modulation performed by the backscatter transmitter 108 and/or backscatter transmitter 110. In some examples, the frequency of the backscattered signal may be frequency-shifted from a frequency of the carrier signal. In some examples, data may be encoded in the backscattered signal using phase- and/or amplitude-shift keying. In some examples, the backscattered signal may be based on phase-shift keying (e.g. QPSK and/or BPSK) and/or amplitude-shift keying subcarrier modulation performed by the backscatter transmitter 108 and/or backscatter transmitter 110. In some examples, different backscatter transmitters in a system may backscatter at different frequency offsets and/or into different frequency bands. In this manner, frequency division multiplexing techniques may be used by a receiver to receive images and/or video from multiple image sensors in a system.

Generally, backscatter transmitters 108 and 110 may backscatter the carrier signal in accordance with pixel values provided by one or more image sensors. For example, the backscatter transmitter 108 may backscatter the carrier signal in accordance with pixel values provided by the image sensor 112. The backscatter transmitter 110 may backscatter the carrier signal in accordance with pixel values provided by the image sensor 114. In some examples, data may be encoded in the backscattered signal using a pulse-containing waveform generated by a pulse width modulator backscatter transmitter. The pulse width modulator may convert analog signals indicative of energy incident on an image sensor into a pulse-containing waveform. Widths of pulses in the pulse-containing waveform may be indicative of the energy incident on the image sensor (e.g., indicative of the pixel values). Pixel values may generally be any number of bits—e.g., 4 bits, 8 bits, 16 bits. Pixel values may also have generally any of a variety of formats (e.g., monochrome, RGB).

Backscatter transmitters and/or carrier signal sources described herein, such as backscatter transmitter 108, backscatter transmitter 110, and/or carrier signal source 104, may each include one or multiple antennas. In this manner, antenna diversity may be leveraged and multiple-input-multiple-output (MIMO) techniques may be used. For example, the carrier signal source 104 may distribute the carrier signal across multiple antennas based on the wireless channel, which may improve wireless signal propagation from the carrier signal source 104 to the backscatter transmitter 108 and/or 110 to the receiver 106.

Image sensors 112 and 114 are shown in FIG. 1. Image sensors may include one or more photodiodes and/or other sensors that may provide a signal having a property that is proportionate to energy incident on the image sensor (e.g., pixel values, pixel brightness). For example, the image sensors may provide signals having a property that is proportionate to pixel values of an image corresponding to energy incident on the image sensor. Generally, an property of a signal may be used and made proportionate to the incident energy. Examples include, but are not limited to, a voltage of a signal, a pulse duration of pulses in the signal. Generally, the image sensors may provide analog signals, which refer to a continuous signal, or a signal with a discrete set of analog values, each proportionate to a pixel value. For example, one or more voltages may be provided indicative of energy incident on photodiodes of the image sensor. Note that in some examples output of the image sensor elements (e.g., photodiodes) may have limited dynamic range (e.g., less than 100 mV in some examples, less than 150 mV in some examples, less than 200 mV in some examples). In some examples, the image sensor itself may provide output pulses, the duration of which may be proportionate to pixel values (e.g., pixel brightness). Note that this image sensor output may be in contrast to digital image sensor outputs which provide a multi-bit representation of pixel values.

In some examples, an image sensor may include multiple image sensor elements (e.g., photodiodes) and a controller for selecting at least one select image sensor element for output at a given time. In this manner, an output may be provided from an image sensor which represents a scan of multiple sensor elements. Image sensors 112 and 114 may be included in, for example, a camera and/or video camera. In the example of FIG. 1, image sensor 112 may provide an output to backscatter transmitter 108. The backscatter transmitter 108 may provide backscatter signals indicative of pixel values at the image sensor 112. Image sensor 114 may provide an output to backscatter transmitter 110. The backscatter transmitter 110 may provide backscatter signals indicative of pixel values at the image sensor 114.

Note that in conventional cameras (e.g., video cameras), a conventional approach may provide output of photodiodes to a low noise amplifier (LNA) with automatic gain control (AGC). The AGC adjusts the amplifier gain to ensure that the output falls within the dynamic range of the analog to digital converter (ADC). Next, the ADC converts the analog voltage into discrete digital values. The video codec then compresses these digital values, which is then transmitted on the wireless communication link.

Such a conventional camera architecture may not support an ultra low-power device. Although camera sensors including an array of photodiodes may operate on as low as 1.2 µW of power in some examples at 128×128 resolution, amplifiers, AGC, ADC, and the compression block generally use higher power by orders of magnitude. Furthermore, the power consumption exacerbates as the resolution and/or the frame rate of the camera is scaled.

Accordingly, examples of image sensors described herein may provide signals having a property proportionate to pixel values corresponding to energy incident on the image sensors. Backscatter transmitters may backscatter a carrier signal in accordance with these signals (e.g., analog signals). Power-hungry functions, such as LNA, AGC, and/or compression, may be performed by receiver 106 in some examples, alleviating power requirements at a backscattering camera.

The receiver 106 may be implemented using any electronic device capable of receiving wireless signals provided by backscatter transmitters, such as backscatter transmitter 108 and/or backscatter transmitter 110. Generally, any electronic device (e.g. wireless communication device) may be used to implement receiver 106 including, but not limited to, access points, routers, hubs, mobile communications devices such as cell phones or tablets, computers, and/or laptops. In some examples, the carrier signal source 104, receiver 106, and backscatter transmitter 108 and/or backscatter transmitter 110 may be physically separate devices.

The receiver 106 may receive one or more backscatter signals provided by a backscatter transmitter. The backscatter signals may encode pixel values from one or more image sensors. The receiver 106 may decode the pixel values and may store the pixel values, and/or display image(s) and/or video using the pixel values. In some examples, backscatter transmitters 108 and/or 110 may provide backscattered signals at a sufficient rate to provide real-time playback of video at the receiver 106. Video frames (e.g., images) may be collected by image sensor 112 and/or 114. Pixel values of the video frames may be backscattered at a sufficient rate to allow for real-time playback at the receiver. For example, pixel values may be transmitted at a sufficient rate such that all pixel values of one frame are received within an amount of time allocated for display of a frame during video playback.

While shown as a separate device from the carrier signal source 104, in some examples the carrier signal source 104 and receiver 106 may be integrated and/or may be the same device. For example, an electronic device may include multiple antennas in some example. One or more antennas in some examples may provide the carrier signal (e.g. be used to implement the carrier signal source 104) while one or more antennas, different from those providing the carrier signal in some examples, may receive the backscatter signal provided by one or more backscatter transmitters (e.g. be used to implement the receiver 106). In some examples, the carrier signal source and the receiver may be integrated into a single device. Cancellation circuitry may be provided in the integrated device to suppress (e.g. cancel) the carrier signal at the receiver.

The receiver 106 may receive backscattered signals provided from the backscatter transmitter 108 and/or backscatter transmitter 110 in the presence of interference from the carrier signal transmitted by the carrier signal source 104. In some examples, specialized hardware may be used by the receiver 106 (e.g. a full-duplex radio) to cancel this interfering signal, however that may not be desired in some examples. In some examples, the carrier signal source 104 may provide a carrier signal that is made up of frequencies (e.g. a single-frequency tone or a multi-frequency signal) outside a desired frequency channel for the transmissions of the backscatter transmitter 108 and/or backscatter transmitter 110. This may ensure and/or aid in the receiver 106 suppressing the out-of-band interference from the carrier signal source 104.

In some examples, the receiver 106 may be implemented in a mobile phone (e.g., a smart phone or other device). The backscatter transmitter(s) may be implemented in a wearable device (e.g., a wearable camera) intended to be worn, carried, or otherwise supported by a user. The same user may also be wearing, carrying, or otherwise supporting the receiver 106 (e.g., a mobile phone) in some examples. Accordingly, in some examples, the distance between a backscatter transmitter and a receiver may not exceed a distance between two points on a user. In other examples, however, other distances may be used and the backscatter transmitter and/or receiver may not be wearable.

While a single carrier signal source 104 is shown in FIG. 1, and a single receiver 106 is shown in FIG. 1, any number of carrier signal sources and/or receivers may be used. In examples having multiple carrier signal sources and/or receivers, the carrier signal sources and/or receivers may be positioned across an area to maximize and/or improve spatial coverage by the carrier signal and/or spatial coverage for receipt of backscattered signals.

Figure 2:
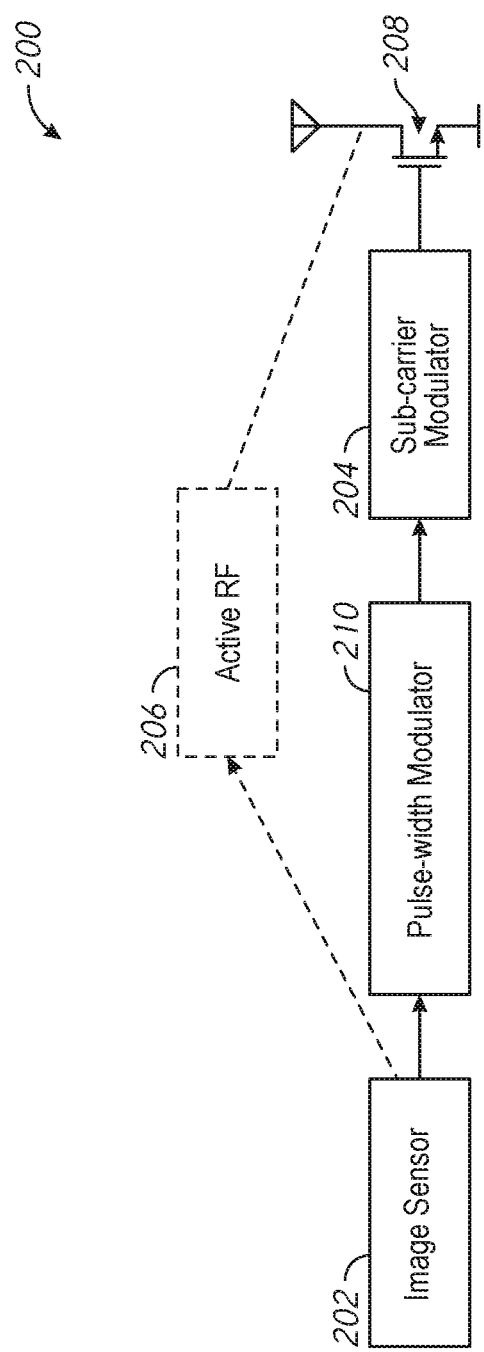
FIG. 2 is a schematic illustration of a backscatter device arranged in accordance with examples described herein.

FIG. 2 is a schematic illustration of a backscatter device arranged in accordance with examples described herein. The backscatter device 200 may be used to implement, for example, the backscatter transmitter 108 and/or backscatter transmitter 110 of FIG. 1. The backscatter device 200 is coupled to image sensor 202, and includes sub-carrier modulator 204, active RF 206, switch 208, and pulse-width modulator 210.

Backscatter devices generally operate by changing antenna impedance. The effect of changing the antenna impedance can be understood to cause the radar cross-section, e.g., the signal reflected by the antenna, also to change between different states.

By utilizing a switch (e.g. switch 208), the antenna impedance may toggle between different impedance states, such as two impedance states. Examples of backscatter device 200 may generate backscatter signals using two impedance states as shown in FIG. 2. For example, the switch 208 may be connected to ground or opened. However, in some examples, additional impedance states may be used by having the switch 208 (or another switch) toggle between any number of impedance states—such as 4 or 8 impedance states. In this manner, any number of impedances may be presented to the antenna of the backscatter device.

In some examples, switching between multiple impedance states may wholly and/or partially suppress harmonic components from the backscattered signal. For example, to provide a backscatter signal having only a single sideband (e.g., suppressing the mirrored harmonic), four impedance elements may be used. Switching between the four elements may allow the backscatter device to backscatter a signal into a frequency without also generating the mirror image sideband at another frequency. For example, the backscatter signal may be provided at a frequency equal to a carrier frequency plus a difference frequency without also providing a backscatter signal at a frequency equal to the carrier frequency minus a difference frequency. In some examples, the backscatter signal may be provided at a frequency equal to a carrier frequency minus a difference frequency without also providing a backscatter signal at a frequency equal to the carrier frequency plus the difference frequency.

In examples described herein, the antenna impedance is toggled in accordance with pixel values provided by an image sensor. The pixel values may be provided to pulse-width modulator 210. In some examples, signals having a property proportionate to pixel values may be provided by image sensors. In some examples, however, stored digital pixel values may be used (e.g., to backscatter a recorded video). The pulse-width modulator 210 may provide a pulse-containing waveform where a pulsewidth (e.g., duty cycle) of the pulses corresponds with the pixel values. In some examples, to provide security, a backscatter transmitter may have a security key (e.g., a unique pseudo random sequence). The width of pulses in the pulse-containing waveform may further be modulated based on the security key. The security key may be known to the receiver and used to decode the received signals using an analogous operation.

The pulse-containing waveform provided by pulse-width modulator may be upconverted using sub-carrier modulator 204. Generally, the backscatter device 200 may shift a frequency of a carrier signal when backscattering. For example, the frequency may be shifted from a single-frequency tone provided outside a desired transmission channel to a frequency within the desired transmission channel. The frequency-shifted signal may be used to provide the backscatter signal. Generally, to shift the frequency of the carrier signal, the switch 208 may be operated at a frequency Δf equal to an amount of desired frequency shift.

For example, the backscatter device 200 may backscatter a single-frequency tone signal, e.g. provided by the carrier signal source 104 of FIG. 1. The single-frequency tone signal may be written as sin $2\pi(f_{backscatter} - \Delta f)t$, where $f_{backscatter}$ is the desired frequency of Wi-Fi transmission by the backscatter device, and Δf is the frequency of a waveform utilized by the backscatter device to perform subcarrier modulation. The backscatter device 200 may utilize a square wave at a frequency Δf to shift the tone to $f_{backscatter}$.

Accordingly, backscatter devices described herein, including the backscatter device 200 of FIG. 2, may provide backscatter signals having a frequency that is shifted from the frequency of a carrier signal by a difference frequency. The difference frequency may be a frequency of (or included in) a waveform provided to the subcarrier modulation circuitry.

During operation, the image sensor 202 may provide pixel values for communication to the pulse-width modulator 210. The pulse-width modulator 210 may provide a waveform having pulses whose width (e.g., duty cycle) corresponds with the pixel values. The waveform may be provided to the sub-carrier modulator 204. A frequency of the waveform may be selected as a difference between a frequency of the carrier signal and a desired frequency of the backscatter signal (e.g. frequency at which a receiver may receive the backscatter signal). The sub-carrier modulated pulse-containing waveform may be used to control switch 208 to backscatter a carrier signal into a data-carrying signal encoded with the pixel values.

Some example backscatter devices may additionally include active RF 206 components such that in one mode, the backscatter device 200 may backscatter signals and have low power (e.g. backscatter) operation, while in another mode the backscatter device 200 may utilize active RF 206 to transmit wireless communication signals conventionally (e.g. generating the device's own carrier signal). The backscatter components and active RF 206 may utilize a same antenna, as shown in FIG. 2, and the antenna connection may be switched between the active RF 206 and sub-carrier modulator 204 in some examples by control circuitry (not shown in FIG. 2). In other examples, the active RF 206 and sub-carrier modulator 204 may utilize different antennas. The active RF 206 may include components to digitize an analog pixel value received from image sensor 202 in some examples.

The antenna may be connected to a switch which selects between the active RF 206 radio and the sub-carrier phase modulator 204. The selection may be made, for example, on a basis of proximity to a carrier signal source. In some examples, when the backscatter device is in the range of a carrier signal source it may couple the phase modulator 204 to the antenna to perform low power backscatter signals. However, when the backscatter device is outside the range of the carrier signal source, the antenna may be coupled to active RF 206.

Image sensor 202 may be implemented using one or more photodiodes or other sensors used to provide a signal indicative of energy incident on the sensor (e.g., a pixel value). Additional circuitry components which may be relatively low power may be used to condition the image sensor signal in some examples.

Although not shown in FIG. 2, the backscatter device 200 may include a power source, such as a battery and/or energy harvesting system. The battery may be implemented using a lithium ion battery. In some examples additionally or instead, energy harvesting components may be provided to power the backscatter device 200, including, but not limited to, components for harvesting solar energy, thermal energy, vibrational energy, or combinations thereof. The power source may power the image sensor 202, sub-carrier modulator 204, and pulse-width modulator 210. In some examples, the active RF 206 may be used when a larger power source than the power source used to power those backscatter components is available (e.g. a wired power source). In some examples, an RF energy harvester may be used. An RF energy harvester may include an antenna and a rectifier which converts incoming RF signals into a low voltage DC output. The low voltage DC may be amplified by a DC-DC converter to generate the voltage levels used for the operation of an image sensor and/or controller. Energy harvesting systems may be used to power backscatter devices and/or backscatter transmitters described herein. The energy harvesting systems may in some examples provide all power (e.g., sufficient power) to completely power the backscatter transmission without use of additional (e.g., battery) power. In some examples, powering a backscatter transmitter with the energy harvesting system may include the energy harvesting system generating sufficient power on demand to power backscatter transmissions. In some examples, powering a backscatter transmitter with the energy harvesting system may include use of the energy harvesting system may to charge storage devices (e.g., batteries, capacitors) that are in turn used to power the backscatter transmission. In some examples, power from the energy harvesting system may be supplemented with power from storage devices and/or other wired or wireless power sources.

The sub-carrier modulator 204 may be implemented using circuitry that may adjust a phase, amplitude, or both of a waveform. In some examples, a field-programmable gate array (FPGA) may be used to implement sub-carrier modulator 204. The sub-carrier modulator 204 may be coupled to the pulse-width modulator 210 and may receive one or more waveforms from the pulse-width modulator 210. The sub-carrier modulator 204 may be coupled to the switch 208 and may provide the output signal to the switch 208.

Switch 208 may be implemented using generally any circuitry for altering impedance presented to an antenna, such as a transistor. The switch 208 is coupled between the sub-carrier modulator 204 and an antenna of the backscatter device 200. In the example of FIG. 2, the switch 208 is implemented using a transistor. Any of a variety of antenna designs may be used. The antenna may be operational in the frequency of the carrier signal and the frequency of the backscatter signal. A high output signal provided by the sub-carrier phase modulator 204 to the gate of the switch 208 accordingly may turn the transistor on, presenting a low impedance to the antenna. A low output signal provided by the sub-carrier phase modulator 204 to the gate of the switch 208 accordingly may turn the transistor off, presenting a high impedance to the antenna. The switch 208 may generally run at a baseband frequency—e.g. a much lower frequency than a frequency of a carrier signal provided to the backscatter device 200. In some examples, the switch 208 may be operated at a frequency of 50 MHz or lower, although other frequencies may also be used in other examples.

Pulse-width modulator 210 may provide a pulse-containing waveform to the sub-carrier modulator 204. Any periodic waveform may generally be used including, but not limited to, a square wave, sine wave, cosine wave, triangle wave, sawtooth wave, analog signal, multi-level signal, or combinations thereof. The pulse-width modulator 210 may be implemented using, hardware, software, or combinations thereof. In some examples, the pulse-width modulator 210 may be implemented using an FPGA, digital signal processor (DSP), and/or microprocessor and executable instructions to provide the desired waveform at the desired frequency. In some examples, the pulse-width modulator 210 may be implemented using a comparator to compare pixel values received from an image sensor with a reference waveform.

In some examples, the carrier signal may be a frequency-hopped signal. The sub-carrier modulator 204 may provide a waveform having a frequency that hops in accordance with the hopping of the frequency-hopping signal used to implement the carrier signal such that the frequency-hopping carrier signal may be backscattered by the backscatter device 200. For example, the carrier signal may be a frequency-hopped signal which has a sequence of frequencies over time. The receive frequency may generally be fixed. Accordingly, the sub-carrier modulator 210 may provide a waveform having a sequence of frequencies such that the data is transmitted at the constant receive frequency over time, despite the hopping frequency of the carrier signal.

A variety of techniques may be used to select the sequence of frequencies for the waveform. In some examples, the sequence of frequencies of the frequency-hopped carrier signal may be received by the backscatter device over a downlink from the carrier signal source used to transmit the carrier signal. In some examples, the sequence of frequencies may be known (e.g. a pseudorandom sequence). The backscatter device may include a memory that may store the sequence of frequencies of the frequency-hopped carrier signal and/or the sequence of frequencies used for the sub-carrier modulator, or indications thereof.

In some examples, backscatter devices described herein may include frequency determination circuitry coupled to an antenna for sensing the carrier signal (e.g. the antenna used to backscatter may be used). The frequency determination circuitry may sense the frequency of the carrier signal and compute a difference between the frequency of the carrier signal and the desired frequency of backscatter signal and provide an indication of the difference (e.g. to be used as the sub-carrier modulation frequency) to the sub-carrier modulator such that the sub-carrier modulator may provide a waveform at the indicated difference frequency.

In the frequency domain, in additional to the desired baseband signal, the pulse-width modulator 210 may also generate additional harmonics which contain redundant copies of the input signal and can result in electromagnetic interference (EMI) from the antenna. However, since the typical power re-radiated by the antenna in a backscatter system is significantly lower than the power transmitted by an active radio, the resulting EMI from the harmonics of the baseband PWM signal in a backscatter system may also be negligible (e.g., less than −20 dBm). Nonetheless, examples described herein may include components and harmonic cancellation techniques to at least partially cancel EMI generated by harmonics of the pulse-width modulated signal provided by the pulse-width modulator 210. In some examples, a dynamic range of the pulse-width modulator 210 is selected (e.g., increased) to reduce the harmonics generated. For example, a PWM conversion with full dynamic range may generate harmonics which are about 4 dB lower than the desired baseband signal. However, if the dynamic range is increased by a factor of 2, the PWM harmonics may reduce to 10 dB lower than the baseband. Accordingly, harmonic suppression can be traded off for slightly reduced performance in some examples. This may be used in some examples, when the image sensor may be close to the receiver where it may re-radiate higher power EMI. At these closer distances, the performance may be safely traded for harmonic suppression.

Additionally or instead, in some examples, a pass filter may be provided after sub-carrier modulation to suppress harmonics and/or transmit a filtered signal. The filtered signal may be backscattered by backscatter transmitters described herein.

Figure 3:
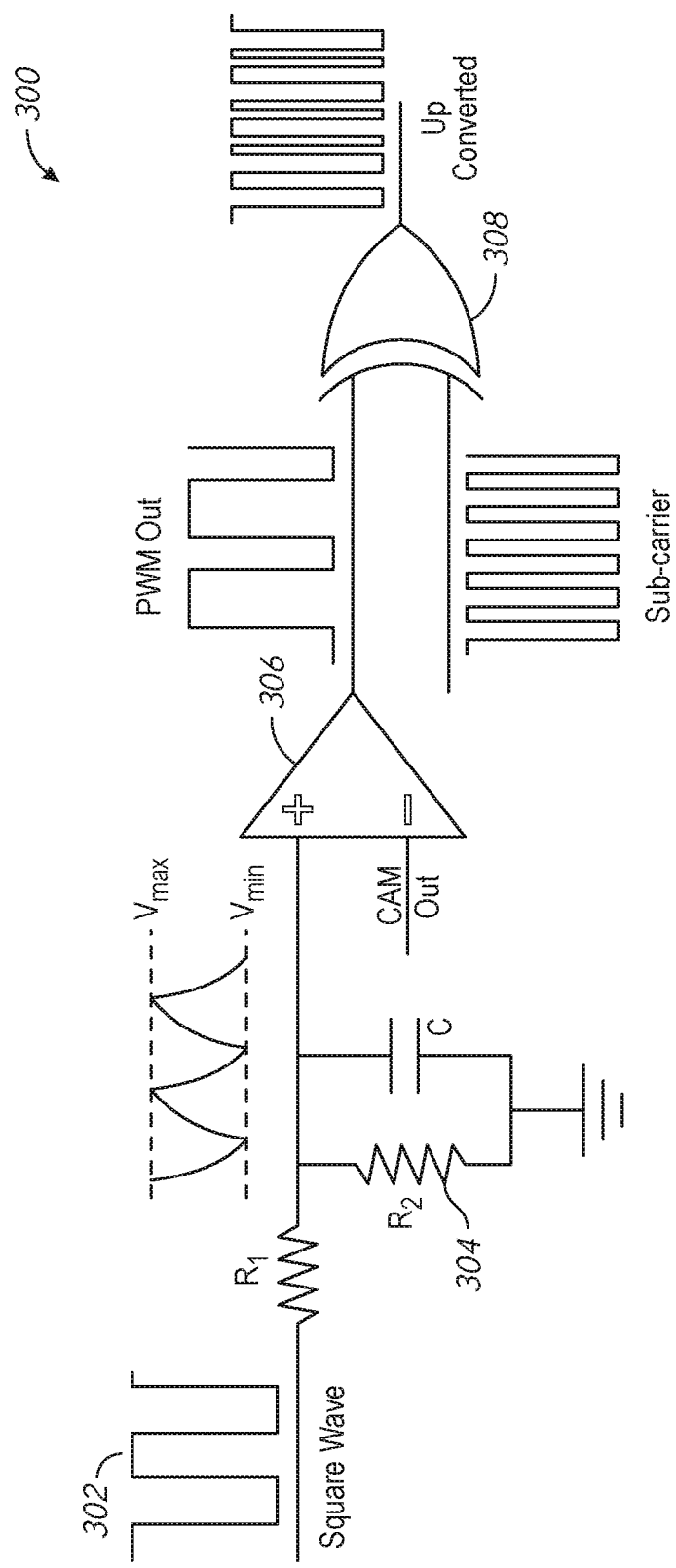
FIG. 3 is an example pulse-width modulator and subcarrier modulator arranged in accordance with examples described herein.

FIG. 3 is an example pulse-width modulator and sub-carrier modulator arranged in accordance with some examples described herein. The circuitry 300 includes input waveform 302, passive elements 304, comparator 306, and mixer 308. Additional, fewer, and/or different components may be used in other examples. The circuitry 300 may be used to implement the sub-carrier modulator 204 and/or pulse-width modulator 210 of FIG. 2 in some examples.

The input waveform 302 may be a square wave and may be provided to passive elements 304 to generate a triangle wave. The triangle wave may be input to one input of comparator 306. Another input of comparator 306 may be provided with analog signals from an image sensor (e.g., signals having a property proportionate to pixel values). Accordingly, the image sensor output may be compared with the triangle wave, generating a pulse-width modulated signal at an output of the comparator 306. The pulse-width modulated signal may be upconverted by mixing the pulse-width modulated signal with a sub-carrier signal. The pulse-width modulated signal may be provided to a first input of mixer 308 (e.g., an XOR gate in the example of FIG. 3). A sub-carrier signal (e.g., a square wave at a sub-carrier frequency) may be provided to another input of mixer 308. The mixer 308 may provide an upconverted pulse-width modulated signal at its output. The upconverted pulse-width modulated signal may be used to backscatter a carrier signal (e.g., may be provided as an input to a backscatter switch, such as switch 208 of FIG. 2).

The input waveform 302 may be provided at a frequency f. In some examples, the frequency of the input waveform 302 may be determined by the frame rate and/or resolution of an image sensor (e.g., camera). The input waveform 302 may be a square wave, as shown in FIG. 3, although other input waveforms may be used in other examples.

The input waveform 302 may be low-pass filtered by passive elements 304 to provide a triangular waveform. The passive elements 304 may accordingly include one or more resistors, capacitors, and/or inductors arranged to provide a low-pass filter. In the example of FIG. 3, the passive elements 304 includes a first resistor coupled between the input waveform 302 and the output of the passive elements 304. A second resistor and a capacitor are provided in parallel with one another between the output of the passive elements 304 and a reference voltage (e.g., ground). In some examples, a triangular waveform may be provided by a backscatter device, and the passive elements 304 may not be used.

The comparator 306 may compare pixel values from an image sensor with the triangular waveform. The comparator 306 may output a first value (e.g., zero) when the triangular signal is less than the pixel value and a second value (e.g., a one) otherwise. Thus, the width of the pulse provided by the comparator 306 may change with the pixel value provided by a camera. In some examples, lower pixel values may have larger pulse durations while higher pixel values may have a lower pulse duration. Minimum and maximum voltages for the triangular signal may be selected to promote and/or ensure that the camera pixel output is within voltage limits.

The circuitry 300 includes subcarrier modulation implemented by mixer 308. The mixer 308 in FIG. 3 is implemented with an XOR gate, although other circuitry may be used in other examples. The sub-carrier may be approximated by a square wave operating at Δf frequency. The sub-carrier and the pulse-width modulated output signal are provided to respective inputs of an XOR gate to upconvert the PWM signal to a frequency offset Δf.

Figure 4:
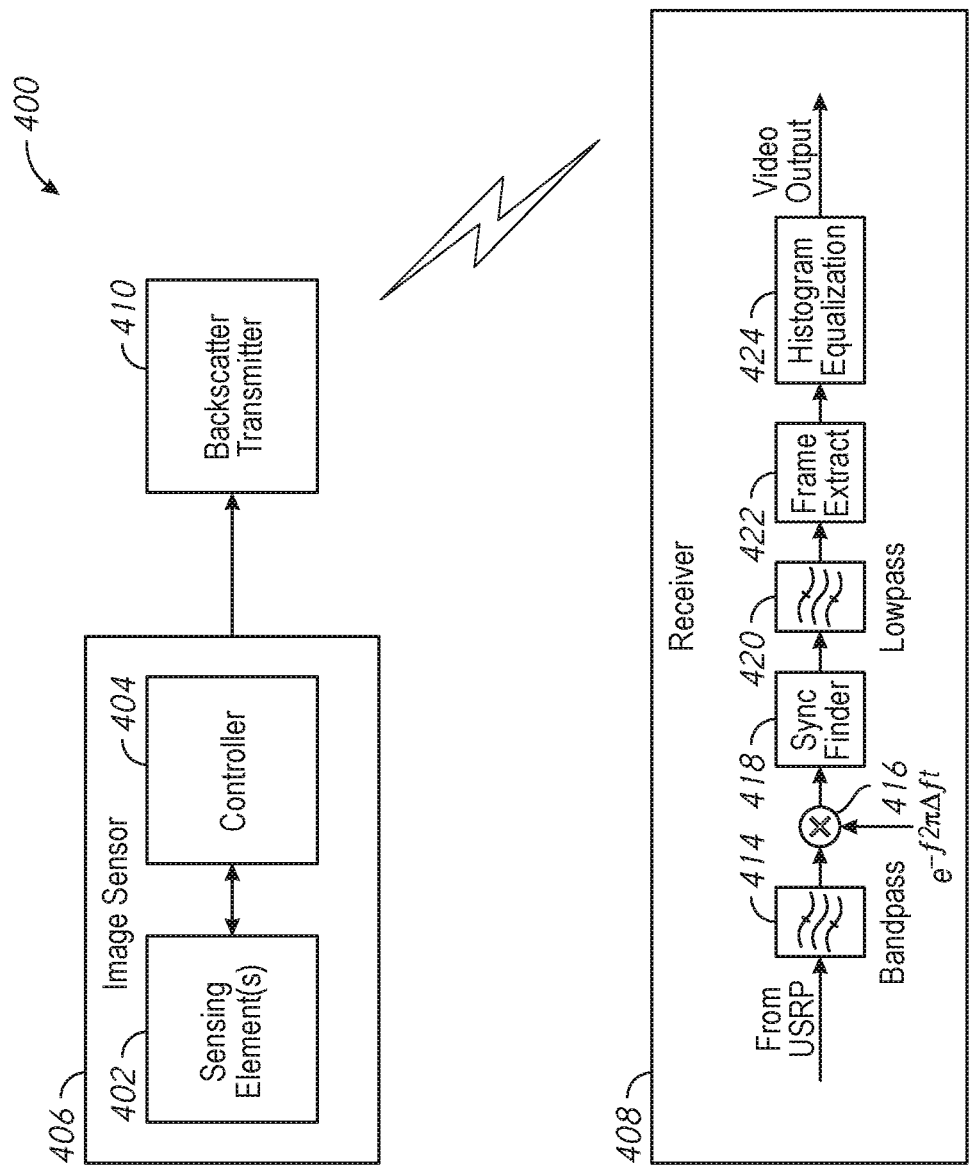
FIG. 4 is a schematic illustration of a system arranged in accordance with examples described herein.

Examples of systems and devices described herein may utilize inter-frame and/or intra-frame compression techniques to further support image and/or video transmission using backscatter transmitters. FIG. 4 is a schematic illustration of a system arranged in accordance with examples described herein. System 400 may include image sensor 406, backscatter transmitter 410, and receiver 408. System 400 may be used to implement the system of FIG. 1 in some examples. The image sensor 406 may include sensing element(s) 402 and controller 404. The receiver 408 may include bandpass filter 414, mixer 416, sync finder 418, low-pass filter 420, frame extractor 422, and/or histogram equalization 424. Additional, fewer, and/or different components may be used in other examples.

The image sensor 406 may include sensing element(s) 402 (e.g., one or more photodiodes, which may be arranged in an array) and controller 404. The controller 404 may control an order in which pixel values corresponding to the sensing element(s) 402 are output and provided to backscatter transmitter 410. For example, the pixel values may be scanned in a raster scan pattern, e.g., from right to left (or vice versa) along each row and/or each column of sensing elements. Other patterns may also be used. In some examples, a zig-zag pattern may be used (e.g., in one direction along one row, then in the opposite direction along the next row).

Note that there may be significant redundancy in the pixel values of each frame (e.g., image) of uncompressed video. Natural video frames usually include objects larger than a single pixel, which means that the colors of nearby pixels may be highly correlated. At the boundaries of objects (e.g., edges), larger pixel variations can occur, but in the interior of an object, the amount of pixel variation may be much less than the theoretical maximum. The net result of the pixel correlations is that the information needed to represent natural images is far less than the worst case maximum. Examples of backscatter transmitters described herein may transmit analog video directly. Note that the bandwidth of the analog signal is a function of the new information contained in the signal. Accordingly, examples described herein may implement zig-zag pixel scanning in which the pixels are scanned in one direction (e.g., from left to right) in odd rows and in the opposite direction (e.g., from right to left) in even rows. Neighboring pixels may have less variation and hence the resulting signal would occupy less bandwidth, generating intra-frame compression. Using the zig-zag scan pattern, the last pixel output from one row may be more likely to be similar to the first pixel output from the next row, which is an adjacent pixel, than a raster scan pattern where the last pixel output from one row is not adjacent to the first pixel output from the next row. To implement a zig-zag pattern, the controller 404 may select sensing element(s) of sensing element(s) 402 for output in accordance with the zig-zag pattern. The output values may be provided to backscatter transmitter 410 for pulse-width and/or sub-carrier modulation as described herein. The backscatter transmitter 410 may backscatter a carrier signal to provide the pixel values to receiver 408.

Other scan patterns may be used in other examples which may advantageously result in consecutively outputting pixel values likely to be similar. For example, in scenes having particularly shaped objects (e.g., people, buildings), the controller 404 may provide outputs from sensing element(s) 402 in a pattern of the object shape (e.g., pixels of a face, body, and/or building may be scanned prior to other portions of the frame).

In addition to or instead of the redundancy within a single frame, the pixel value output may also have significant redundancy between consecutive frames. Examples of receivers described herein may provide components for inter-frame compression. For example, examples of image sensors, such as image sensor 406 may provide super-pixel output. Super-pixel output may refer to the average of a set of adjacent pixel values. Generally, a frame may include an N×N array of pixels which can be divided into smaller sections of n×n pixels. A super-pixel corresponding to each section may be an average of all the pixels in the n×n section of the frame. Example of super-pixel sizes include 3×3, 5×5 and 7×7 pixels. Other examples may also be used, including non-square sections (e.g., 3×2 or 3×5, for example). Examples of sensing elements used in image sensors include photodiodes that that output a current and/or voltage proportional to the intensity of incident energy (e.g., light). The image sensor may provide a buffer stage to convert an output current into an output voltage. To compute a super-pixel, examples of image sensors may combines the current from a set of pixels and then convert the combined current into a voltage output, in the analog domain. Accordingly, image sensor 406 may include circuitry to average pixel values from a group of pixels (e.g., from multiple ones of sensing element(s) 402). The backscatter transmitter 410 may accordingly backscatter super-pixel values corresponding to an average pixel value for each set of pixels in a frame.

Accordingly, instead of transmitting the entire N×N pixel frame, the backscatter transmitter 410 may transmit a lower resolution frame including n×n sized super-pixels (e.g., the average value of the pixels in the n×n block). Such a low resolution frame may be referred to as the L frame. Example receivers may perform computation on received L frames and may implement a change driven compression technique. For example, the receiver 408 may, in real time, compare an incoming L frame with a previously-received L frame. If a super-pixel value differs by more than a predetermined threshold between frames, the receiver 408 may determine that the super-pixel has sufficiently changed and may request the backscatter transmitter 410 to transmit all the pixels corresponding to the super-pixel. If the difference does not exceed the threshold, then the receiver 408 may use the pixel values corresponding to the previous reconstructed frame to synthesize a new frame and does not request new pixel values for the super-pixel. The frame which contains the pixel values corresponding to the sufficiently changed super-pixels may be referred to as the super-pixel or S frame. In addition to transmitting the S and L frames, the backscatter transmitter 410 may periodically transmit uncompressed frames (I) to correct for potential artifacts and errors that may have been accumulated in the compression process.

A variety of sequences of frames and pixel transmissions may accordingly be used. In some examples, between a number of uncompressed frames (e.g., between two uncompressed frames), a backscatter transmitter may provide a number, M, of low resolution frame L and another number K of super-pixel frames S which contain pixel values corresponding to super-pixels whose values have differed more than the threshold between consecutive low resolution frames. The number of L and S frames (M and K) transmitted between consecutive I frames may reflect a tradeoff between the overhead associated with transmission of full resolution frames and artifacts and errors that are introduced by the compression process. In one example of 10 fps HD video streaming, an I frame may be transmitted after a transmission of every 80 L and S frames. Other numbers may be used in other examples.

A block diagram of components used to recover a transmitted video and/or image data from backscatter signals described herein is shown in FIG. 4. The receiver 408 may be used, for example, to implement receiver 106 of FIG. 1. A bandpass filter 414 may be used to filter received energy to a frequency of interest (e.g., a frequency of the backscatter signals). A mixer 416 may be used to downconvert the signal to baseband. In some examples, a quadrature down conversion mixer may be used. A sync finder 418 may be used to identify line and/or frame syncs. For example, the received downconverted data may in some examples be correlated with 13 and 11 bit Barker codes to find the frame sync and line sync. After locating the frame and line sync pulses, a lowpass filter 420 may be used to remove out of band noise. The frame extractor 422 may divide the row in evenly spaced time intervals corresponding to the number of pixels in a single row of the image sensor. The pixel value may be recovered by calculating the average voltage of the signal which corresponds to the duty cycle of the PWM modulated signal. The recovered pixel values may be sequentially arranged into rows and columns to create video frames and/or images. Histogram equalization 424 may be used to adjust the intensity of the frames and enhance the contrast of the output video. The components of receiver 408 shown may be implemented, for example using circuitry, such as an application-specific integrated circuit (ASIC), and/or one or more processing units.

Examples of systems, devices, and methods described herein may find use in a variety of applications. For example, backscatter transmitters may be incorporated in security cameras for use in backscattering pixel data associated with surveillance video. In this matter, low-power and/or battery-free operation of a surveillance camera may be achieved. In some examples, image and/or video sensors used in smart home applications may utilize pixel data backscattering systems, devices, and methods described herein. A camera incorporated in, for example, a doorbell or other home monitoring device may backscatter pixel data in accordance with techniques described herein.

Examples of receivers may analyze received images and/or video and take various actions based on the received data. For example, receivers may include and/or be in communication with other systems which provide image recognition or another analysis. Responsive to identifying a person, and/or a particular person, the receiver may provide a signal to send an alarm, grant access, turn off power when room empty, and/or take another action.

Examples of robots and/or drones may utilize backscatter transmitters described herein to provide low power transmission of video and/or images captured by the robot and/or drone. The transmitted images may be used to control the robot and/or drone.

Examples of implanted devices may utilize backscatter transmitters described herein. For example, a swallowed pill may incorporate a backscatter transmitter described herein and may provide, through backscatter, images and/or video captured from within a human or other body. The pixel values may be transmitted to a receiver which may be placed proximate to and/or worn by the patient having swallowed the pill.

EXAMPLE IMPLEMENTATIONS

An ASIC was simulated that showed 60 fps 720p and 1080p HD video streaming is possible for 321 µW and 806 µW respectively. This translated to 1,000× to 10,000× lower power than existing digital video streaming approaches. Empirical results also showed that enough energy could be harvested to enable battery-free 30 fps 1080p video streaming at up to 8 feet. A system was demonstrated that can successfully backscatter 720p HD video at 10 fps up to 16 feet.

An example system implementation described herein was created using an ultra-low power FPGA platform. An HD camera was used and provided to a digital-to-analog converter (DAC). The DAC provided analog values indicative of pixel values. In other examples, an HD camera may be used which itself may provide signals having a property proportionate to pixel values.

720p HD video was streamed at 10 frames per second up to 16 feet from the receiver. The Effective Number of Bits (ENOB) received for each pixel at distances below six feet was more than 7 bits. This was for all practical purposes identical to the quality of the source HD video.

Inter and intra frame compression techniques were used to reduce the total bandwidth requirements by up to two orders of magnitude comparing to the raw video. For example, for 720p HD video at 10 fps, an implemented design used a wireless bandwidth of only 0.98 MHz and 2.8 MHz in an average-case and worst-case scenario video respectively.

An ASIC implementation was evaluated, taking into account the power consumption for the pixel array. The power consumption for video streaming at 720p HD was 321 µW and 252 µW for 60 and 30 fps respectively. The power consumption at 1080p full-HD was 806 µW and 561 µW at 60 and 30 fps.

An implemented wireless camera did not include power-hungry ADCs and video codecs. The implemented wireless camera included an image sensor, PWM, a digital block for camera control and sub-carrier modulation, a backscatter switch and an antenna. A high definition (HD) and a low-resolution version of the wireless camera were implemented.

The low resolution wireless camera was built using a 112×112 grayscale random pixel access camera which provided readout access to the individual analog pixels. A digital control block was implemented on a low power Igloo Nano FPGA by MICROSEMI. The analog output of the image sensor was fed to the PWM converter built using passive RC components and an NCX2200 comparator by MAXIM. R1=83KΩ, R2=213KΩ and C=78 pF in the PWM converter design of FIG. 3, which supported a video frame rate of up to 13 fps. The digital output of the PWM converter was provided as input to an FPGA which performed sub-carrier modulation at 1.024 MHz using an XOR gate and output the sub-carrier modulated PWM signal to an ADG919 switch by ANALOG DEVICES which switched a 2 dBi dipole antenna between open and short impedance states. The FPGA injected frame and line synchronization patterns into the frames data before backscattering. Barker codes of length 11 and 13 were used for frame and line synchronization patterns respectively. Barker codes have high-autocorrelation property which may aid the receiver more efficiently detect them in the presence of noise.

To implement an HD resolution wireless camera, HD resolution sample videos lasting 1 minute each were stored. The recorded digital images were output using a USB interface to an analog converter (DAC) followed by an amplifier to simulate voltage levels corresponding to an HD quality image sensor operating at 10 fps. Given the USB speeds, a maximum frame rate of 10 fps was achieved. The voltage output was provided to a PWM converter. For the high-resolution version of the wireless camera, we set R1=10KΩ, R2=100KΩ and C=10 pF and used LMV7219 comparator by Texas Instruments in the PWM converter. The digital block and the rest of the components of the system were the same as the low resolution wireless camera described herein except that sub-carrier frequency was set to ~10 MHz to avoid and/or reduce aliasing.

An application specific integrated circuit (ASIC) implementation of backscatter transmitters described herein was implemented for a range of video resolutions and frame rate. An ASIC integrated the image sensor, PWM converter, digital core, oscillator and backscatter modulator in a small silicon chip. One implementation was performed in TSMC 65 nm LP CMOS process.

To support higher resolution and higher frame rate video, we simply increase the operating frequency of the oscillator, PWM converter and the digital core. As an example, 360 p at 60 fps used a 10.4 MHz input clock which consumed a total of 42.4 µW in the digital core, PWM converter and backscatter switch whereas a 1080p video at 60 fps used ~124.4 MHz input clock which consumed 408 µW in the digital core, PWM converter and the backscatter switch. To eliminate aliasing, a sub-carrier frequency equal to the input clock of each scenario was used.

A receiver was implemented on the USRP X-300 USRP software defined radio platform by Ettus Research. The receiver used a bi-static radar configuration with two 6 dBi circularly polarized antennas. The transmit antenna was connected to a UBX-160 daughterboard which transmitted a single tone signal. The output power of the USRP was set to 30 dBm using the RF5110 RF power amplifier. The receive antenna was connected to another UBX-160 daughter board configured as a receiver. The receive daughter board down converted the PWM modulated backscattered RF signal to baseband and sampled it at 10 Msps. The digital samples were transmitted to a PC via an Ethernet interface.

The high definition wireless camera device was deployed in a lab space and set to transmit 23 dBm into a 6 dBi patch antenna. The distance between the receiver and the wireless camera was varied from 4 to 16 feet and the camera was set to repeatedly stream a 15-second-long video using PWM backscatter communication described herein. The 720p resolution video was streamed at 10 fps and the pixel values were encoded as 8-bit values in monochrome format. The wirelessly received video was recorded at the receiver and the Signal to Noise Ratio (SNR) was measured, and from that, the Effective Number of Bits (ENOB) were calculated at the receiver.

Up to 6 feet from the reader, an ENOB greater than 7 was achieved which translated to negligible degradation in the quality of the video streamed using PWM backscatter techniques described herein.

From the foregoing it will be appreciated that, although specific embodiments have been described herein for purposes of illustration, various modifications may be made while remaining with the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signal may be provided directly to and/or received directly from the recited components without intervening components, but also may be provided to and/or received from the certain components through intervening components.

What is claimed is:

1. An apparatus comprising:
    an image sensor, the image sensor configured to provide signals indicative of energy incident on the image sensor, wherein the signals indicative of energy incident on the image sensor comprise signals indicative of a super pixel comprising average pixel values for sets of pixels in a frame;

a pulse width modulator, the pulse width modulator coupled to the image sensor and configured to convert the signals indicative of energy incident on the image sensor into a pulse-containing waveform wherein widths of pulses in the pulse-containing waveform are indicative of the energy incident on the image sensor;

an antenna;

a switch coupled to the pulse width modulator and the antenna, the switch configured to control an impedance at the antenna to backscatter a carrier signal incident on the antenna in accordance with the pulse-containing waveform.

2. The apparatus of claim 1, wherein the image sensor comprises a photo-diode and wherein the signals indicative of energy incident on the image sensor comprise voltage signals.

3. The apparatus of claim 1, wherein duty cycles of the pulses in the pulse-containing waveform are proportional with the voltage signals.

4. The apparatus of claim 1, further comprising a subcarrier modulator configured to up-convert the pulse-containing waveform using a frequency offset from the carrier signal.

5. The apparatus of claim 1, wherein the image sensor comprises a camera configured to operate at a frame rate, and wherein the pulse width modulator comprises a comparator, the comparator configured to receive a triangular wave at the frame rate and pixel values from the camera, the comparator configured to output a first value when a pixel value is less than the triangular wave and a second value when the pixel value is greater than the triangular wave.

6. The apparatus of claim 1, wherein the image sensor comprises a camera and wherein the signals indicative of energy incident on the image sensor comprise signals indicative of pixel values, wherein the camera is configured to provide signals indicative of pixel values in a zig-zag scan pattern.

7. A system comprising:
an image sensor configured to provide signals having a property proportionate to pixel values of an image corresponding to energy incident on the image sensor;
a backscatter transmitter, in communication with an energy harvesting system, and configured to provide a backscatter signal by backscattering a carrier signal incident on the backscatter transmitter in accordance with the pixel values, wherein the backscatter transmitter is further configured to utilize energy from the energy harvesting system to backscatter the carrier signal;
a carrier signal source positioned to provide the carrier signal; and
a receiver configured to receive the backscatter signal and decode the pixel values.

8. The system of claim 7, wherein the carrier signal source is further configured to provide commands to the backscatter transmitter, the image sensor, or combinations thereof.

9. The system of claim 7, wherein the backscatter transmitter is configured to convert the signals having the property proportionate to pixel values into a pulse-containing waveform, wherein pulse widths in the pulse-containing waveforms correspond with the pixel values.

10. The system of claim 7, wherein the backscatter transmitter is configured to provide the backscatter signal at a backscatter frequency, wherein the backscatter frequency is shifted from a frequency of the carrier signal.

11. The system of claim 7, further comprising an additional backscatter transmitter, wherein the backscatter transmitter and the additional backscatter transmitter are configured to backscatter the carrier signal into different frequency bands.

12. A system comprising:
an image sensor configured to provide signals having a property proportionate to pixel values of an image corresponding to energy incident on the image sensor;
a backscatter transmitter configured to provide a backscatter signal by backscattering a carrier signal incident on the backscatter transmitter in accordance with the pixel values;
a carrier signal source positioned to provide the carrier signal; and
a receiver configured to receive the backscatter signal and decode the pixel values, wherein the backscatter signal comprises super-pixels, and wherein the receiver is further configured to compare multiple frames of super-pixels and request at least a portion of a complete frame when the multiple frames of super-pixels differ by greater than a threshold amount.

13. A method comprising:
providing a signal indicative of energy incident on an image sensor, wherein the signal comprises signals indicative of a super-pixel comprising average pixel values for sets of pixels in a frame;
providing a carrier signal;
providing a pulse-containing signal having pulses whose widths correspond with pixel values; and
backscattering the carrier signal in accordance with the pulse-containing signal to transmit image data.

14. The method of claim 13, wherein the carrier signal comprises an ambient TV signal, WiFi signal, or combinations thereof.

15. The method of claim 13, further comprising modulating the pulse-containing signal using a security key.

16. The method of claim 13, wherein providing the pulse-containing signal comprises utilizing a signal including analog representations of the pixel values.

17. The method of claim 13, wherein backscattering the carrier signal comprises performing subcarrier modulation to shift a frequency of a backscatter signal from a frequency of the carrier signal.

18. The method of claim 13, further comprising:
pulse-width modulating the signal from the image sensor to provide the pulse-containing signal; and
at least partially cancelling harmonic signals generated by said pulse-width modulating.

* * * * *